US012219241B2

(12) United States Patent
Shimada et al.

(10) Patent No.: US 12,219,241 B2
(45) Date of Patent: Feb. 4, 2025

(54) IMAGING APPARATUS, IMAGE PROCESSING METHOD, AND IMAGE PROCESSING PROGRAM

(71) Applicant: FUJIFILM Corporation, Tokyo (JP)

(72) Inventors: Tomoharu Shimada, Saitama (JP); Takehiro Koguchi, Saitama (JP); Shinya Fujiwara, Saitama (JP); Taro Saito, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

(21) Appl. No.: 18/192,240

(22) Filed: Mar. 29, 2023

(65) Prior Publication Data
US 2023/0247279 A1 Aug. 3, 2023

Related U.S. Application Data

(63) Continuation of application No. PCT/JP2021/035523, filed on Sep. 28, 2021.

(30) Foreign Application Priority Data

Sep. 30, 2020 (JP) .................................. 2020-164802

(51) Int. Cl.
H04N 23/63 (2023.01)
(52) U.S. Cl.
CPC ......... H04N 23/632 (2023.01); H04N 23/635 (2023.01)
(58) Field of Classification Search
CPC .. H04N 23/632; H04N 23/635; H04N 23/611; H04N 23/62; H04N 23/667;
(Continued)

(56) References Cited

U.S. PATENT DOCUMENTS 7,492,406 B2 * 2/2009 Park ........................ H04N 23/69
348/240.2
8,319,883 B2 * 11/2012 Hada .................... H04N 23/611
348/346
(Continued)

FOREIGN PATENT DOCUMENTS

| JP | 2007-28163 A | 2/2007 |
| JP | 2012-186670 A | 9/2012 |
| JP | 2020-92315 A | 6/2020 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2021/035523, dated Apr. 13, 2023, with an English translation.

(Continued)

*Primary Examiner* — Timothy J Henn
(74) *Attorney, Agent, or Firm* — Birch, Stewart, Kolasch & Birch, LLP

(57) ABSTRACT

Provided are an imaging apparatus, an image processing method, and an image processing program capable of improving operability in a case in which manual focus adjustment is performed. Processing of extracting a plurality of subjects from moving image data obtained by imaging is performed, first moving image data in which a region including a specific subject among the plurality of subjects is magnified is output to a display destination, and, in a case in which a change has occurred in any of the plurality of subjects in the moving image data, second moving image data in which a region of each of the plurality of subjects is magnified is output to the display destination instead of the first moving image data, and then, in a case in which an instruction to select the subject is given, third moving image data in which a region including a selected subject is (Continued)

magnified is output to the display destination instead of the second moving image data.

21 Claims, 30 Drawing Sheets

(58) Field of Classification Search
CPC ...... H04N 23/675; H04N 23/69; G03B 13/02; G03B 17/18
See application file for complete search history.

(56) References Cited

U.S. PATENT DOCUMENTS

| | | | | |
|---|---|---|---|---|
| 8,400,556 | B2* | 3/2013 | Aoki | H04N 23/635 348/333.01 |
| 8,456,536 | B2* | 6/2013 | Sugino | H04N 23/62 348/346 |
| 8,717,477 | B2* | 5/2014 | Oogami | H04N 23/673 348/346 |
| 9,894,280 | B2* | 2/2018 | Sakaguchi | H04N 23/61 |
| 10,270,975 | B2* | 4/2019 | Qin | G06V 40/161 |
| 10,432,876 | B2* | 10/2019 | Hirooka | H04N 23/69 |
| 10,516,829 | B2* | 12/2019 | Shin | G06F 3/14 |
| 2005/0046730 | A1* | 3/2005 | Li | H04N 23/635 348/333.12 |
| 2007/0098396 | A1* | 5/2007 | Watanabe | H04N 23/61 396/374 |
| 2008/0024643 | A1* | 1/2008 | Kato | G06V 40/166 348/333.12 |
| 2008/0240563 | A1* | 10/2008 | Takano | H04N 23/635 382/173 |
| 2009/0268076 | A1* | 10/2009 | Kawamura | H04N 23/61 348/333.12 |
| 2011/0199502 | A1* | 8/2011 | Okamura | H04N 23/69 348/222.1 |
| 2012/0229675 | A1 | 9/2012 | Yamamoto | |
| 2020/0099866 | A1* | 3/2020 | Dwarakanath | H04N 23/69 |
| 2020/0177818 | A1 | 6/2020 | Kagaya et al. | |

OTHER PUBLICATIONS

International Search Report (Form PCT/ISA/210) for International Application No. PCT/JP2021/035523, dated Dec. 14, 2021, with an English translation.

* cited by examiner

FIG. 10
(A)
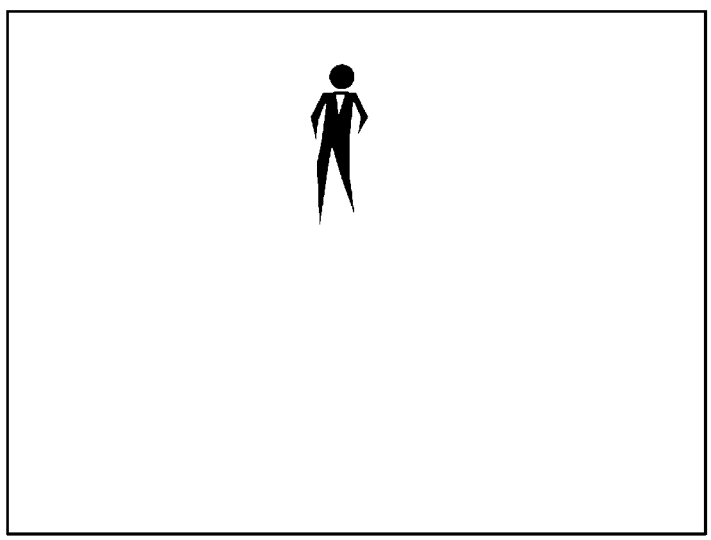
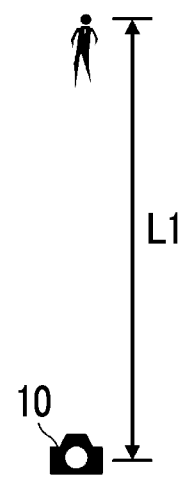
(B)
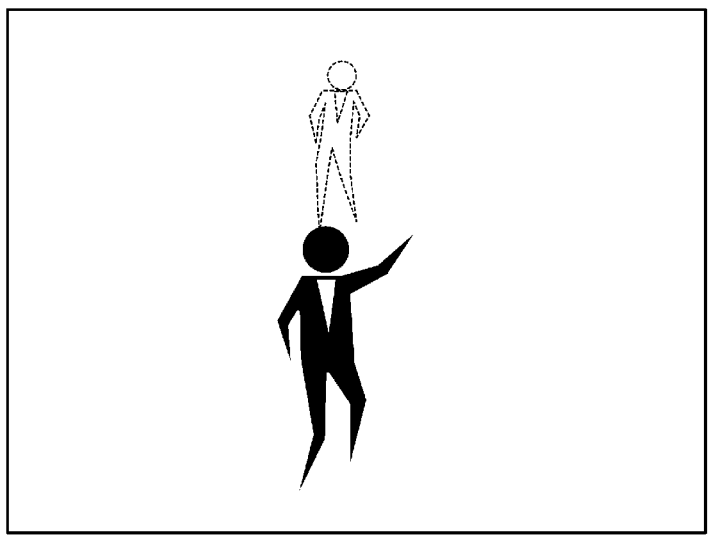
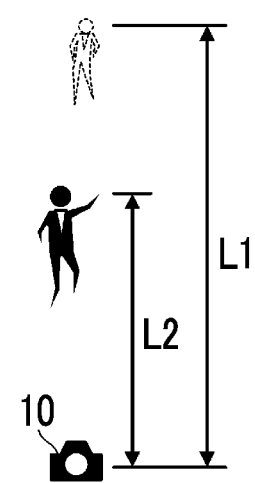

FIG. 20

| ITEM OF CHANGE DETERMINATION | | THE NUMBER OF TIMES OF SWITCHING | SWITCHING RATE |
|---|---|---|---|
| 1 | POSITION | 30 | 0% |
| 2 | SIZE | 20 | 60% |
| 3 | PHASE DIFFERENCE | 10 | 3% |

IMAGING APPARATUS, IMAGE PROCESSING METHOD, AND IMAGE PROCESSING PROGRAM

CROSS-REFERENCE TO RELATED APPLICATIONS

The present application is a Continuation of PCT International Application No. PCT/JP2021/035523 filed on Sep. 28, 2021 claiming priority under 35 U.S.C. § 119 (a) to Japanese Patent Application No. 2020-164802 filed on Sep. 30, 2020. Each of the above applications is hereby expressly incorporated by reference, in its entirety, into the present application.

BACKGROUND OF THE INVENTION

1. Field of the Invention

The present invention relates to an imaging apparatus, an image processing method, and an image processing program, and more particularly to an imaging apparatus, an image processing method, and an image processing program which output moving image data obtained by imaging to a display destination.

2. Description of the Related Art

JP2020-92315A discloses a technology of automatically switching a display of a live view based on focus information of an imaging apparatus in a case in which focus adjustment is performed.

SUMMARY OF THE INVENTION

One embodiment according to the technology of the present disclosure provides an imaging apparatus, an image processing method, and an image processing program capable of improving operability in a case in which manual focus adjustment is performed.

(1) An imaging apparatus comprising a processor, in which, in a mode in which focus adjustment is performed, the processor performs processing of extracting a plurality of subjects from moving image data obtained by imaging, outputs first moving image data in which a region including a specific subject among the plurality of subjects is magnified to a display destination, and outputs, in a case in which a change has occurred in any of the plurality of subjects in the moving image data, second moving image data in which a region of each of the plurality of subjects is magnified to the display destination instead of the first moving image data, and then outputs, in a case in which an instruction to select the subject is given, third moving image data in which a region including the selected subject is magnified to the display destination instead of the second moving image data.

(2) The imaging apparatus according to (1), in which, in a case in which the instruction to select the subject is not given within a first time after the second moving image data is output to the display destination instead of the first moving image data, the processor outputs the first moving image data to the display destination instead of the second moving image data.

(3) The imaging apparatus according to (1) or (2), in which the plurality of subjects magnified in the second moving image data include at least the subject in which the change has occurred.

(4) The imaging apparatus according to any one of (1) to (3), in which the processor further performs processing of receiving a setting of a condition for determining whether or not the change has occurred in the subject.

(5) The imaging apparatus according to any one of (1) to (3), in which the processor further performs processing of correcting a condition for determining whether or not the change has occurred in the subject based on a history of the instruction to select the subject.

(6) The imaging apparatus according to (4) or (5), in which the condition includes at least one of an item used for determination or a threshold value used for determination.

(7) The imaging apparatus according to any one of (1) to (6), in which the processor determines whether or not the change has occurred in the subject based on a change in at least one item of a position, a size, or a subject distance.

(8) The imaging apparatus according to any one of (1) to (7), in which the processor outputs, as the second moving image data, an image in which magnification images of the plurality of subjects are sequentially switched to the display destination.

(9) The imaging apparatus according to any one of (1) to (8), in which the processor outputs, as the second moving image data, an image including an entire image of the moving image data to the display destination in addition to magnification images of the plurality of subjects.

(10) The imaging apparatus according to (9), in which the processor performs processing of surrounding the magnification images with frames having different colors, respectively, and surrounding corresponding subjects in the entire image with frames having the same color, respectively, in the second moving image data.

(11) The imaging apparatus according to any one of (1) to (10), in which the processor further performs processing of selecting a target to be magnified in the second moving image data from among the plurality of subjects extracted from the moving image data.

(12) The imaging apparatus according to (11), in which the processor further performs processing of receiving a setting of a condition for selecting the target to be magnified in the second moving image data.

(13) The imaging apparatus according to (11), in which the processor further performs processing of correcting the condition for selecting the target to be magnified in the second moving image data based on a history of the instruction to select the subject.

(14) The imaging apparatus according to any one of (11) to (13), in which the processor selects the target to be magnified in the second moving image data based on a change in at least one item of a position, a size, or a subject distance.

(15) The imaging apparatus according to any one of (1) to (13), in which, in a case in which the instruction to select the subject is not given within a first time after the second moving image data is output to the display destination, the processor excludes the subject, which is determined that the change has occurred in a case in which the first moving image data is switched to the second moving image data, from a target for which the change is detected during a second time after elapse of the first time.

(16) The imaging apparatus according to any one of (1) to (15), in which, in a case in which a determination as to whether or not the change has occurred in the subject is made for a plurality of items, in a case in which the instruction to select the subject is not given within a first time after the second moving image data is output to the display destination, the processor excludes an item, which is determined that the change has occurred in a case in which the first moving image data is switched to the second moving image data, from a condition for detecting the change during a second time after elapse of the first time.

(17) The imaging apparatus according to any one of (1) to (16), in which, in a case in which a setting of making a depth of field in the imaging narrower than a specific value is performed, the processor raises a magnification ratio of the subject in a case of magnification display.

(18) The imaging apparatus according to any one of (1) to (17), in which, in a case in which a value of a high-frequency component in a region to be magnified is less than a specific value, the processor lowers a magnification ratio of the subject in a case of magnification display.

(19) The imaging apparatus according to any one of (1) to (18), in which a display unit provided in an apparatus body and/or an external display device connected via a connection unit provided in the apparatus body is used as the display destination.

(20) An image processing method comprising extracting a plurality of subjects from moving image data obtained by imaging, outputting first moving image data in which a region including a specific subject among the plurality of subjects is magnified to a display destination, and outputting, in a case in which a change has occurred in any of the plurality of subjects in the moving image data, second moving image data in which a region of each of the plurality of subjects is magnified to the display destination instead of the first moving image data, and then outputting, in a case in which an instruction to select the subject is given, third moving image data in which a region including the selected subject is magnified to the display destination instead of the second moving image data.

(21) An image processing program causing a computer to execute a process comprising extracting a plurality of subjects from moving image data obtained by imaging, outputting first moving image data in which a region including a specific subject among the plurality of subjects is magnified to a display destination, and outputting, in a case in which a change has occurred in any of the plurality of subjects in the moving image data, second moving image data in which a region of each of the plurality of subjects is magnified to the display destination instead of the first moving image data, and then outputting, in a case in which an instruction to select the subject is given, third moving image data in which a region including the selected subject is magnified to the display destination instead of the second moving image data.

BRIEF DESCRIPTION OF THE DRAWINGS

FIG. 10 is a conceptual diagram showing an example of measurement of a change amount of a phase difference.

FIG. 20 is a table showing an example of the number of times of switching and a switching rate for each item of change determination.

DESCRIPTION OF THE PREFERRED EMBODIMENTS

Hereinafter, preferred embodiments of the present invention will be described in detail with reference to the accompanying drawings.

First Embodiment

A magnification display function is known as one of functions of live view provided in an imaging apparatus. The magnification display function of the live view is a function of cutting out a part of an entire image displayed as an image of normal live view and magnifying and displaying an entire display region of the live view. In a general case, the magnification display function of the live view is used in a case in which manual focus adjustment is performed. In addition, in a general case, in a case of using the magnification display function, a user manually selects a position to be magnified. However, in a case in which the manual focus adjustment is performed, a method of manually selecting the position to be magnified by the user has a drawback that an operation is complicated. Hereinafter, an imaging apparatus capable of improving operability in a case in which the manual focus adjustment is performed by using the magnification display function of the live view will be described.

[Hardware Configuration of Imaging Apparatus]

Figure 1:
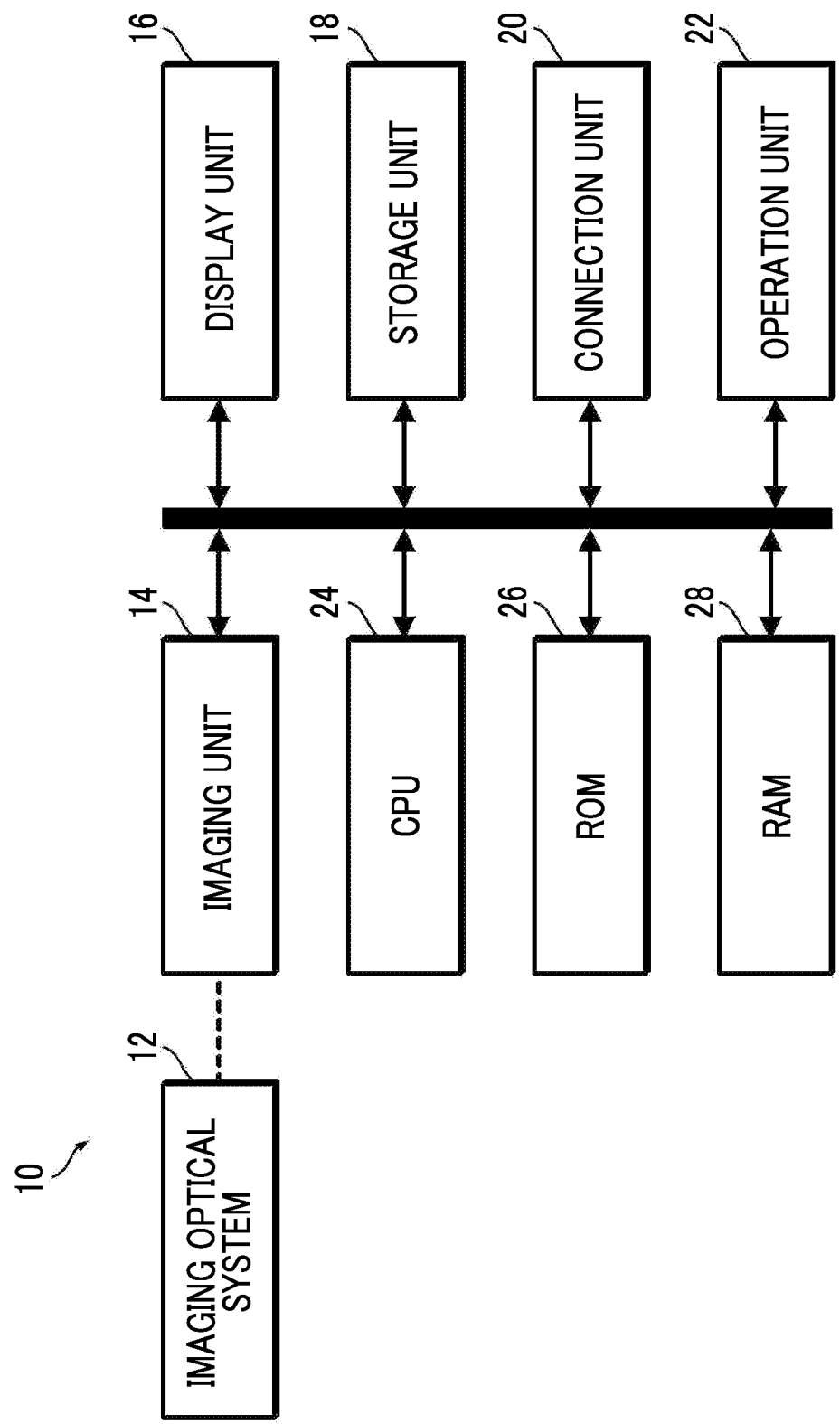
FIG. 1 is a block diagram showing an example of a hardware configuration of an imaging apparatus.

FIG. 1 is a block diagram showing an example of a hardware configuration of the imaging apparatus.

The imaging apparatus 10 according to the present embodiment is an imaging apparatus that can capture a moving image, and comprises, in an apparatus body (not shown), an imaging optical system 12, an imaging unit 14, a display unit 16, a storage unit 18, a connection unit 20, an operation unit 22, a central processing unit (CPU) 24, a read only memory (ROM) 26, a random access memory (RAM) 28, and the like.

The imaging optical system 12 comprises a plurality of lens groups that form a subject image on an imaging element, a stop that adjusts an amount of light, and the like. The imaging optical system 12 can comprise, as a unit that adjusts the amount of light, a dimming filter or a neural density filter (ND) filter, which is a type of a dimming filter, in addition to the stop or instead of the stop.

The imaging optical system 12 performs the focus adjustment by moving a part of the lens group or the entire lens group back and forth along an optical axis. The lens group for focus adjustment is an example of a focus lens. An actuator, such as a direct current motor, a linear motor, a stepping motor, or an ultrasound motor, is used for driving the lens group for focus adjustment.

The imaging optical system 12 can perform manual focus adjustment, and an actuator for focus adjustment is driven in response to an operation of an operation ring (focus ring) provided in a lens barrel. A configuration can also be adopted in which the manual focus adjustment is performed by using an operation lever or the like in addition to the operation ring.

In a case in which the manual focus adjustment is performed, a focus adjustment mode (focus mode) is set to a manual focus mode. The focus adjustment mode comprises an auto focus mode in addition to the manual focus mode. The focus adjustment mode is switched, for example, by a switch (focus mode changeover switch). In addition, there may be a semi-auto focus mode. The semi-auto focus mode includes a case in which the manual focus adjustment is performed, but a focus adjustment status is also monitored by an auto focus adjustment device, and the focus adjustment is taken over by the auto focus in a case in which an object of the manual focus adjustment can be recognized, and a case in which the focus adjustment is first performed by auto focus and the fine adjustment is performed by manual adjustment.

The imaging unit 14 comprises an imaging element that converts an optical image into an electric signal. As the imaging element, for example, a complementary metal oxide semiconductor (CMOS) image sensor having a predetermined color filter arrangement (for example, a Bayer arrangement) or a charged coupled device (CCD) image sensor is used.

In the imaging apparatus 10 according to the present embodiment, a CMOS image sensor comprising a driving unit, an analog to digital converter (ADC), a signal processing unit, or the like is used as the imaging element. In this case, the imaging element is driven by being operated by the built-in driving unit. In addition, a signal of each pixel is converted into a digital signal by the built-in ADC. Further, the signal of each pixel is subjected to signal processing, such as sampling two correlation pile processing, gain processing, and correction processing, by the built-in signal processing unit. It should be noted that a configuration may be adopted in which the signal processing is performed on an analog signal of each pixel or a configuration may be adopted in which the signal processing is performed on the digital signal of each pixel.

In addition, in the imaging apparatus 10 according to the present embodiment, an imaging element in which a phase difference pixel is incorporated is used as the imaging element. Information on the phase difference of a subject in a screen can be acquired by using the imaging element in which the phase difference pixel is incorporated. In addition, a focus deviation direction and a focus deviation amount (defocus amount) of the subject in the screen can be detected from the acquired information on the phase difference. The imaging element in which the phase difference pixel is incorporated and the method of detecting the phase difference using the imaging element are known. Therefore, a detailed description thereof will be omitted.

Capturing the moving image is performed at a predetermined frame rate. The frame rate may be fixed or may be configured to be set to any value by the user.

The display unit 16 is configured by a display, such as a liquid crystal display (LCD) or an organic EL display (organic light emitting diode display, OLED display). The imaging apparatus 10 according to the present embodiment comprises a touch panel on a display surface of a display constituting the display unit 16. That is, the display constituting the display unit 16 is configured by a touch panel display. It should be noted that the touch panel may have a so-called in-cell type configuration that is built in the display unit 16. The display unit 16 also includes a display unit in a form of an electronic view fielder (EVF). However, in a case in which the display unit 16 is configured by the EVF, the display unit 16 does not comprise the touch panel, but can be provided with, for example, a visual line detection function.

The display unit 16 displays the live view during the imaging. In addition, the display unit 16 is also used as a user interface in a case of performing various settings.

The storage unit 18 is used for storing captured moving image data (moving image data for recording) and is also used for storing various data. The storage unit 18 is configured by, for example, a semiconductor memory having a non-volatile property, such as an electrically erasable programmable read-only memory (EEPROM) including a flash memory, or a solid state drive (SSD) incorporating these semiconductor memories. The storage unit 18 may have a configuration integrally provided in the apparatus body (form of a so-called built-in memory) or have a configuration an attachable/detachable configuration (form of a so-called memory card).

The connection unit 20 comprises a terminal that connects an external device (for example, an external display device or an external recording device). As a connection standard, for example, a high-definition multimedia interface (HDMI) or the like can be adopted (HDMI is a registered trademark).

The operation unit 22 comprises various operation members for operating the imaging apparatus 10. The operation members include the touch panel, in addition to various operation buttons, such as a power button, a record button, a mode dial, and a command dial. In particular, in the imaging apparatus 10 according to the present embodiment, the operation unit 22 comprises, as the operation members, the focus mode changeover switch for switching the focus mode, a live view button for turning on or off the display of the live view, a tracking magnification display button for turning on or off a tracking magnification display function in a case of the live view, or the like. The focus mode changeover switch is configured by, for example, a slide-type switch, and the focus mode (focus adjustment mode) is selectively switched to the auto focus mode, the manual focus mode, or the like by switching the position of the switch. The live view button is configured by, for example, a press-type button, and the display of the live view is switched to be turned on or off each time the button is pressed. The tracking magnification display function will be described below.

The CPU 24 is an example of a processor. The CPU 24 functions as a control unit, an image processing unit, and the like of the imaging apparatus 10 by executing a predetermined program. The control performed by the CPU 24 includes display control on the display unit 16, recording control on the storage unit 18, and the like, in addition to imaging control, such as automatic exposure and auto focus. In addition, the image processing performed by the CPU 24 includes generation processing of moving image data for recording and moving image data for display (for live view), compression processing of the moving image data for recording, and the like. The moving image data for recording and the moving image data for display are generated by performing predetermined image processing (so-called development treatment) on RAW data (raw moving image data output from the imaging unit 14). The image processing here includes offset processing, gamma correction processing, demosaicing processing, RGB/YCrCb conversion processing, white balance processing, and the like. Since the above processing is known processing, the detailed description thereof will be omitted. The compression processing is processing of generating a moving image file in a predetermined compression format. A well-known codec can be adopted as the codec in a case of the compression. For example, a codec standardized by a moving picture experts group (MPEG) (MPEG-1, MPEG-2, MPEG-4, or the like) can be adopted.

It should be noted that a configuration can also be adopted in which a part or all of the above-described processing performed by the CPU 24 are performed by hardware provided inside the CPU 24.

The ROM 26 stores a program executed by the CPU 24 and various data necessary for control or the like. It should be noted that the memory constituting the ROM 26 includes the EEPROM including the flash memory.

The RAM 28 is used as a work region in a case in which the CPU 24 performs various types of processing.

[Display Control of Live View]

The display control of the live view will be described below.

[Overview of Display Control of Live View]

The imaging apparatus 10 according to the present embodiment is provided with a function of tracking and magnifying the specific subject (tracking magnification display function) as one function of the live view. The operation unit 22 comprises the tracking magnification display button for turning on or off the tracking magnification display function. The tracking magnification display button is configured by, for example, a press-type button. In a case in which the tracking magnification display button is pressed in a state in which the live view is turned on, the tracking magnification display function is turned on. In addition, in a case in which the tracking magnification display button is pressed in a state in which the tracking magnification display function is turned on, the tracking magnification display function is turned off. In the imaging apparatus 10 according to the present embodiment, the tracking magnification display function can be turned on only in a case in which the manual focus mode is set. That is, the tracking magnification display function is always turned off in the other focus modes.

Figure 2:
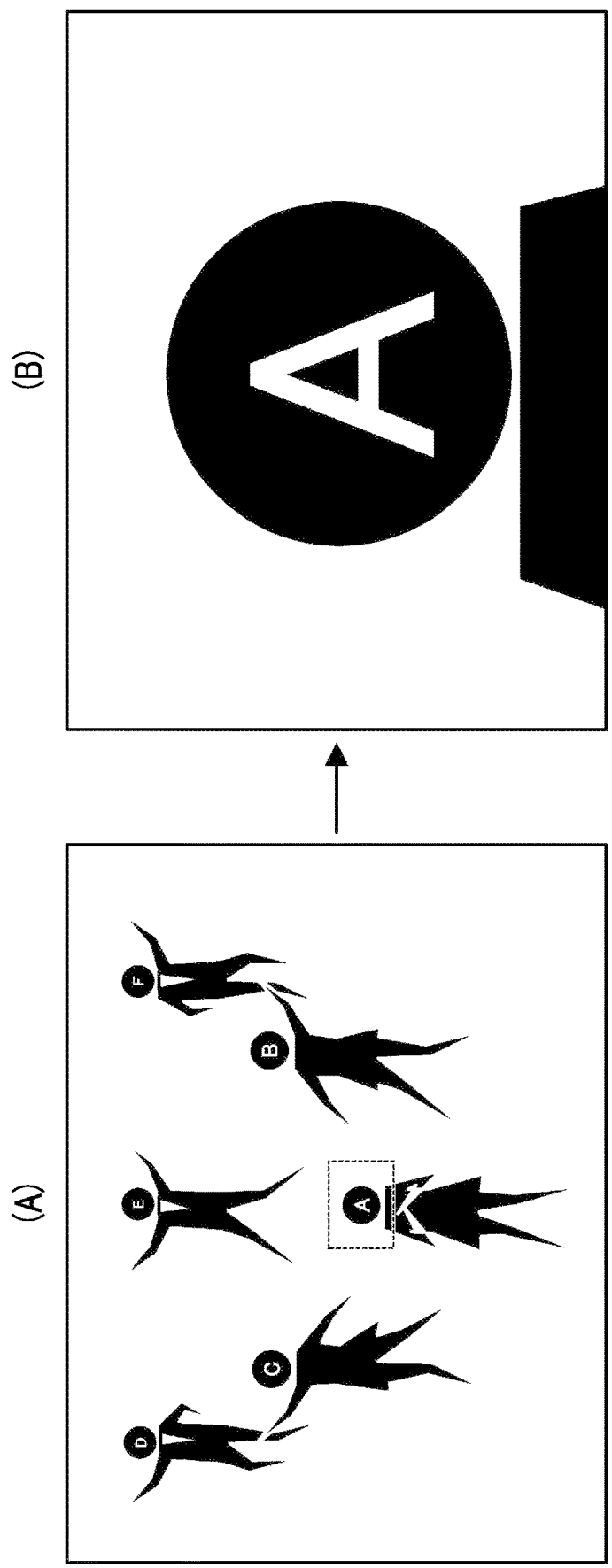
FIG. 2 is a conceptual diagram of a function of tracking and magnifying a specific subject.

FIG. 2 is a conceptual diagram of the function of tracking and magnifying the specific subject.

A portion (A) in FIG. 2 shows the display of the normal live view. In the display of the normal live view, the entire image is displayed in the entire display region of the live view. The entire image means an image in which the entire image captured by the imaging unit 14 is displayed. It should be noted that the image in a case in which the entire image is displayed at a predetermined visual field ratio is also included in the entire image here. Hereinafter, a form in which the entire image is displayed in the entire display region of the live view is referred to as the entire display, as necessary. The display region of the live view means a region set as a region in which the live view is displayed within the entire display region of the display unit 16. Therefore, in a case in which the entire display region of the display unit 16 is used as the display region of the live view, the image of the live view is displayed in the entire display region of the display unit 16.

Here, the user turns on the tracking magnification display function and selects a subject A as a target to be magnified. After the selection is completed, the display of the screen is switched, and as shown in a portion (B) in FIG. 2, an image obtained in which the subject A is magnified by itself at a predetermined magnification ratio is displayed as the image of the live view. Hereinafter, the present display form will be referred to as single magnification display, as necessary. That is, a form in which the subject is magnified and displayed by itself is referred to as the single magnification display. Thereafter, the single magnification display is performed by following the movement of the subject A. That is, an image is always displayed in which the subject A is positioned at the center (substantially the center) of the display region of the live view and magnified.

The present function is provided as a function of supporting the manual focus adjustment. Therefore, a subject to be focused on is selected as the target to be magnified. By tracking and magnifying the subject to be focused on, the user can concentrate on a focusing operation and can improve the operability.

In a case of changing the target to be magnified, it is generally considered that the magnification is temporarily released, the display is returned to the normal display, and the selection operation is repeated.

However, in order to change the target to be magnified by such a procedure, there is a problem that the operation is complicated and the operation of the focus adjustment is neglected during the operation.

Therefore, in the imaging apparatus 10 according to the present embodiment, in a case in which a change being equal to or more than a predetermined amount is observed in the subject being imaged, the magnification is automatically released and the switching to the screen for selecting the subject is performed.

Figure 3:
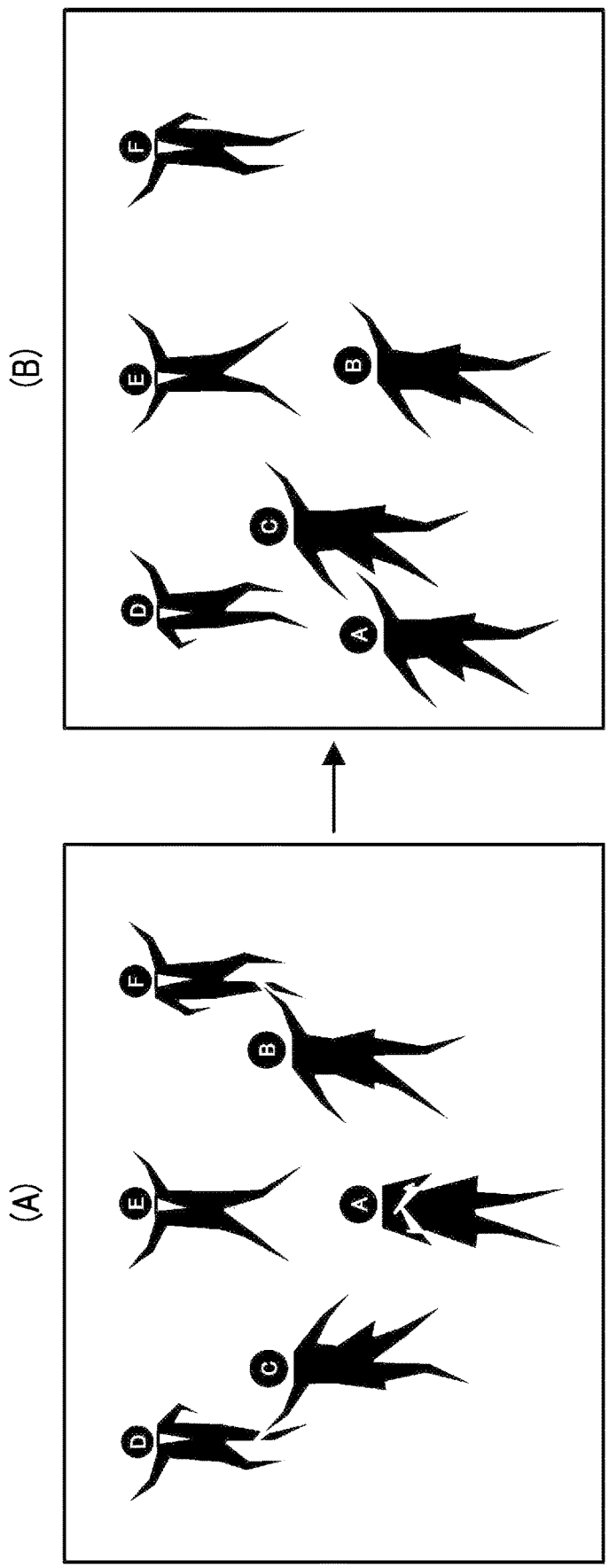
FIG. 3 is a diagram showing an example of a change in the subject.

FIG. 3 is a diagram showing an example of the change in the subject.

In the imaging apparatus 10 according to the present embodiment, the magnification is released in a case in which at least one of a position, a size, or a subject distance is changed.

A portion (A) in FIG. 3 shows a captured image at a certain point in time. A portion (B) in FIG. 3 shows a captured image after a predetermined time has elapsed from the point in time in the portion (A) in FIG. 3. In this example, the positions of the subject A and a subject B are changed. In addition, for the subject B, the subject distance is also changed. In the image captured in this way, in a case in which the change being equal to or more than the predetermined amount has occurred in at least one of the position, the size, or the subject distance of the subject being imaged, the magnification is released.

Figure 4:
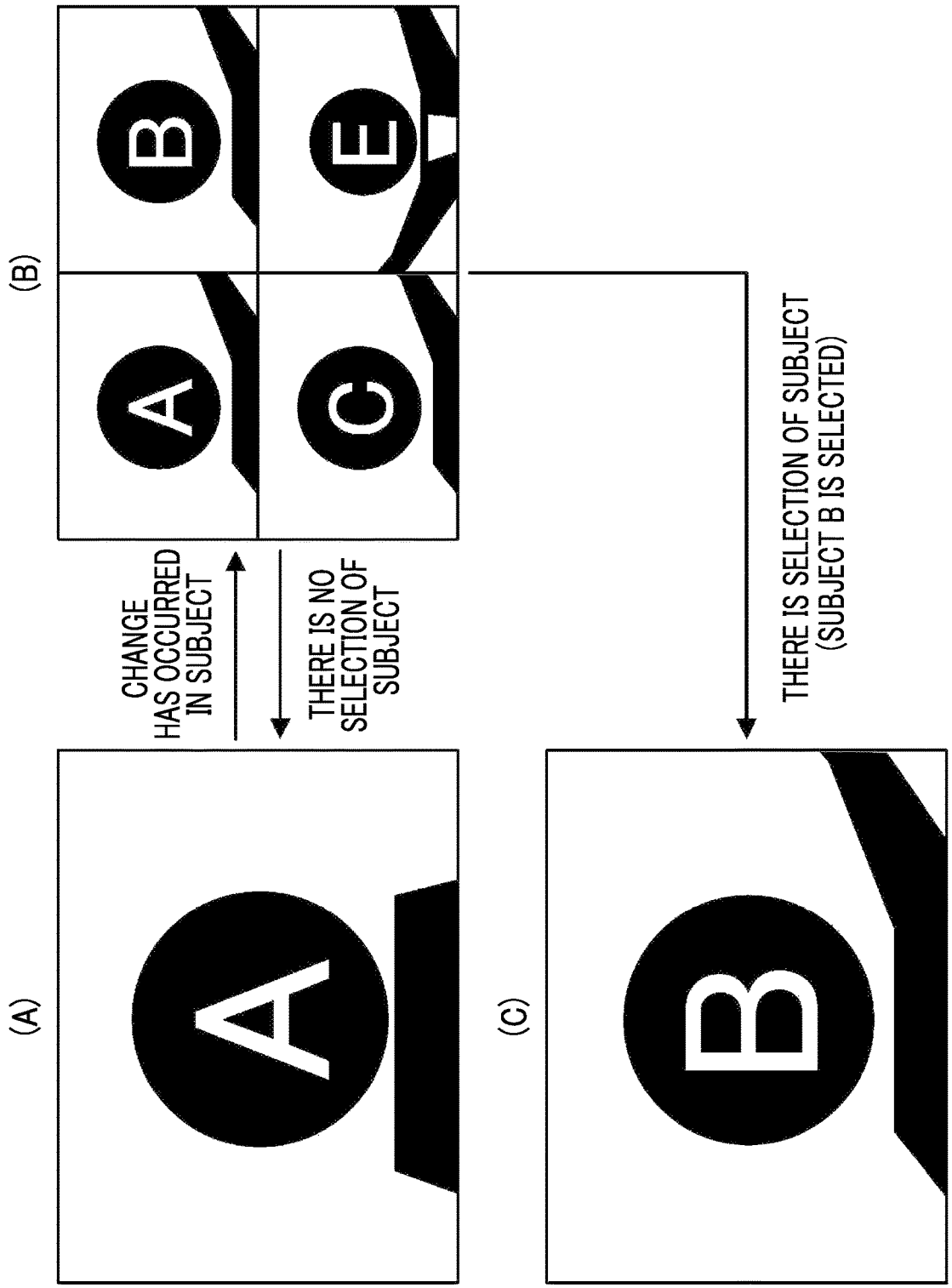
FIG. 4 is a diagram showing an example of transition of screen display.

FIG. 4 is a diagram showing an example of the transition of the screen display.

A portion (A) in FIG. 4 shows an example of the screen display in a case of the single magnification display. The portion (A) in FIG. 4 shows an example of a case in which the subject A is selected as the target to be magnified.

A portion (B) in FIG. 4 shows an example of the selection screen of the subject. In this example, an example of a case is shown in which one screen is divided into four equal parts and a subject as a magnification candidate is displayed in each region. The subject as the candidate is magnified and displayed in each region. The display of each region is performed following the movement of the subject. That is, in each region, the image is displayed in which each subject is positioned at the center (substantially the center) of each region and magnified. The image of the subject magnified and displayed in each region is an example of a magnification image. The user selects one of the subjects (magnification images) displayed in each region, and selects the target to be magnified.

A portion (C) in FIG. 4 shows an example of the single magnification display in a case in which the subject B is selected in the selection screen of the subject shown in the portion (B) in FIG. 4. As shown in the portion (C) in FIG. 4, in a case in which the subject to be magnified (subject B in this example) is selected, the display is switched to the single magnification display, and the selected subject (subject B in this example) is magnified and displayed by itself. Thereafter, the single magnification display is performed following the movement of the selected subject (subject B in this example).

The selection is performed within a defined time. In a case in which the selection is not performed within the defined time, the original display is restored. In the example shown in FIG. 4, as shown in the portion (A) in FIG. 4, the switching to a screen in which the subject A is magnified and displayed by itself is performed.

In this way, by controlling the display of the live view, it is possible to realize good operability in a case in which the manual focus adjustment is performed.

[Function Related to Display Control of Live View]

Figure 5:
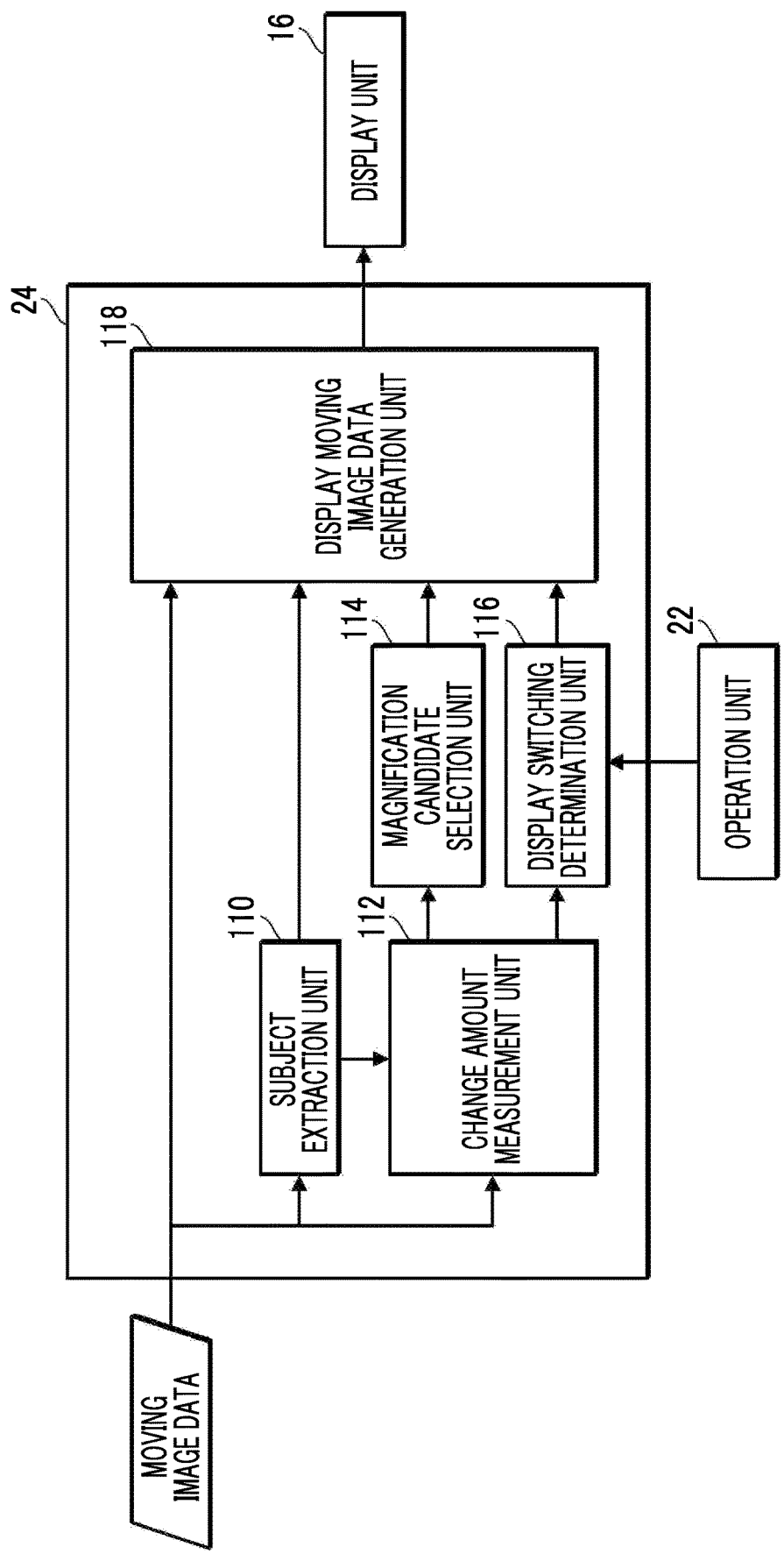
FIG. 5 is a block diagram of a function realized by a CPU regarding display control of live view.

FIG. 5 is a block diagram of a function realized by the CPU regarding the display control of the live view.

As shown in FIG. 5, the CPU 24 functions as a subject extraction unit 110, a change amount measurement unit 112, a magnification candidate selection unit 114, a display switching determination unit 116, and a display moving image data generation unit 118, regarding the display of the live view. Each function is realized by the CPU 24 executing a predetermined program (image processing program).

The subject extraction unit 110 processes the moving image data obtained by the imaging and extracts the subject from the image of each frame. In the imaging apparatus 10 according to the present embodiment, a face of a person is extracted as the subject. As a technology of extracting the face of the person from the image, a known technology can be adopted. For example, it is possible to adopt a technology of extracting a region of the face of the person by using an image recognition model generated by machine learning, deep learning, or the like.

Figure 6:
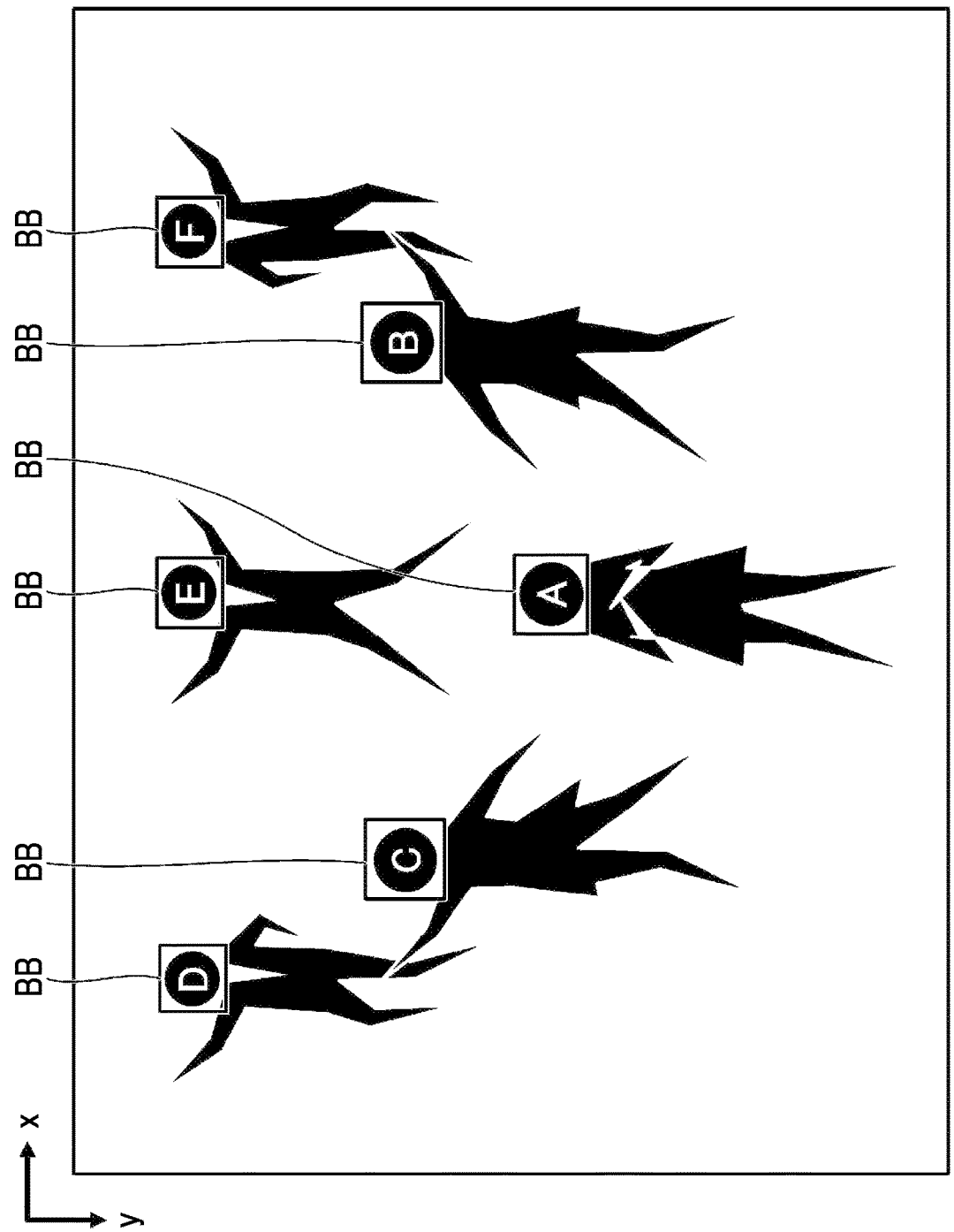
FIG. 6 is a diagram showing an example of an extraction result of the subject.

FIG. 6 is a diagram showing an example of an extraction result of the subject.

As shown in FIG. 6, the extracted subject is surrounded with a bounding box BB, and a position and a size thereof are specified. The position of the subject is specified, for example, by a coordinate position (x, y) at the center or the center of gravity of the bounding box BB. In addition, the size of the subject is specified by, for example, an area of the bounding box BB.

The subject is extracted periodically at a predetermined extraction period. In addition, the subjects are numbered in an order of the extraction (k=1, 2 . . . ).

The change amount measurement unit 112 measures change amounts of the position, the size, and the phase difference for each subject extracted by the subject extraction unit 110. The measurement is periodically performed at a predetermined measurement period. Therefore, the change amount for each period is measured. The measurement period is set according to the extraction period of the subject.

Figure 7:
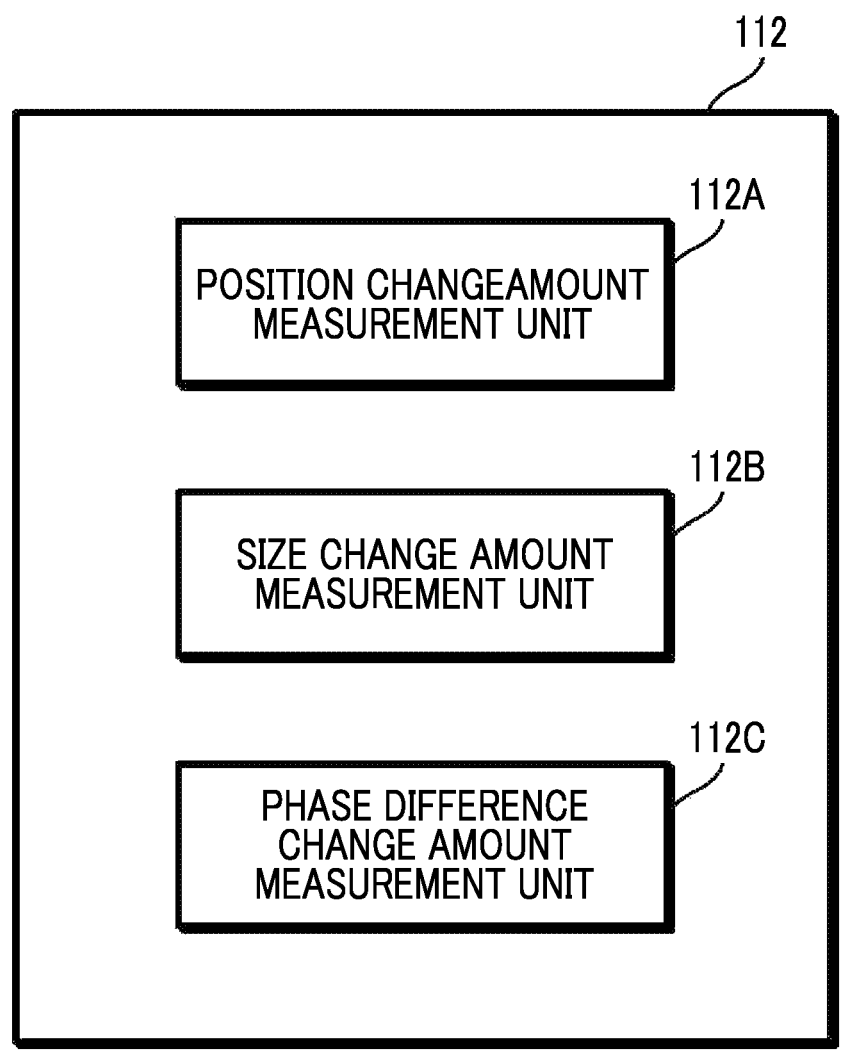
FIG. 7 is a block diagram of a function of a change amount measurement unit.

FIG. 7 is a block diagram of a function of the change amount measurement unit.

As shown in FIG. 7, the change amount measurement unit 112 has functions of a position change amount measurement unit 112A, a size change amount measurement unit 112B, and a phase difference change amount measurement unit 112C.

Based on the extraction result of the subject by the subject extraction unit 110, the position change amount measurement unit 112A measures the change amount of the position of each subject.

Figure 8:
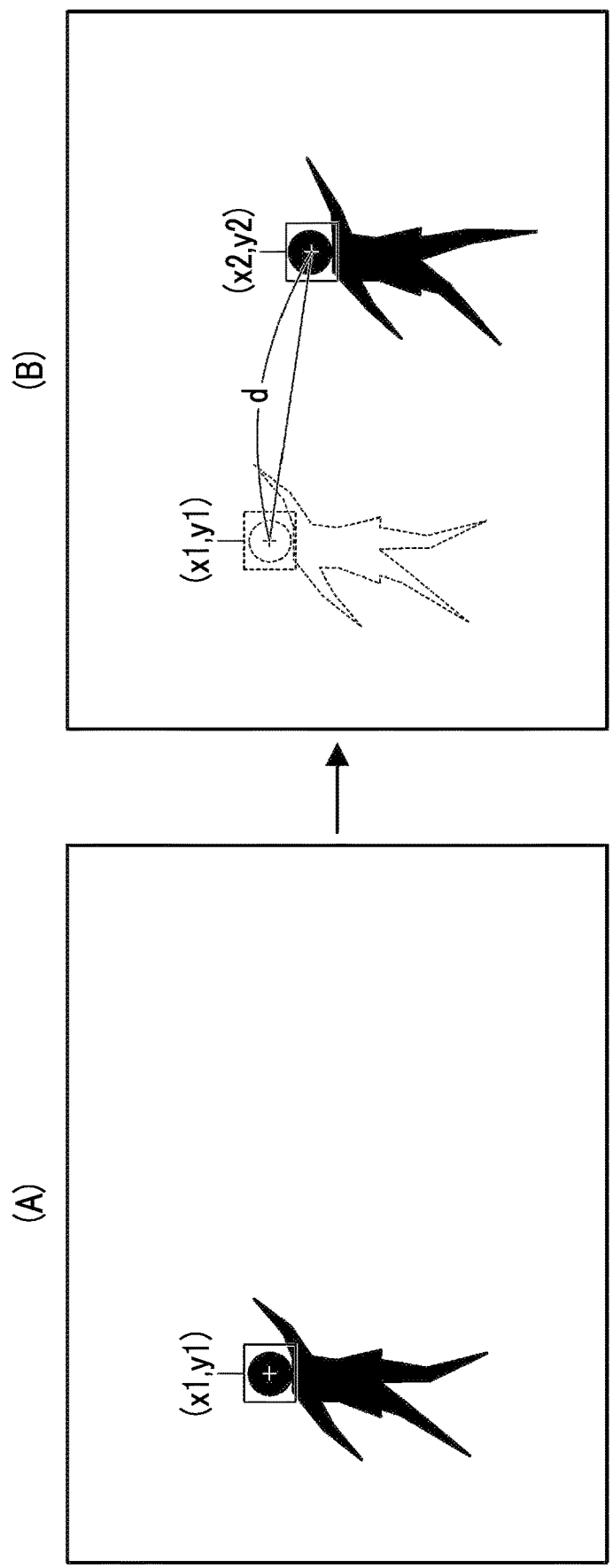
FIG. 8 is a conceptual diagram showing an example of measurement of a change amount of a position.

FIG. 8 is a conceptual diagram showing an example of the measurement of the change amount of the position. A portion (B) in FIG. 8 shows a captured image at a certain measurement point in time, and a portion (A) in FIG. 8 shows a captured image at the measurement point in time one period before.

The change amount of the position of the subject is measured as a displacement amount of the coordinate position. For example, the coordinate position of the subject at a certain measurement point in time is (x2, y2). In a case in which the coordinate position of the subject at the measurement point in time one period before is (x1, y1), a change amount d of the position is calculated by $((x2-x1)^2+(y2-y1)^2)^{1/2}$.

Based on the extraction result of the subject by the subject extraction unit 110, the size change amount measurement unit 112B measures the change amount of the size of each subject.

Figure 9:
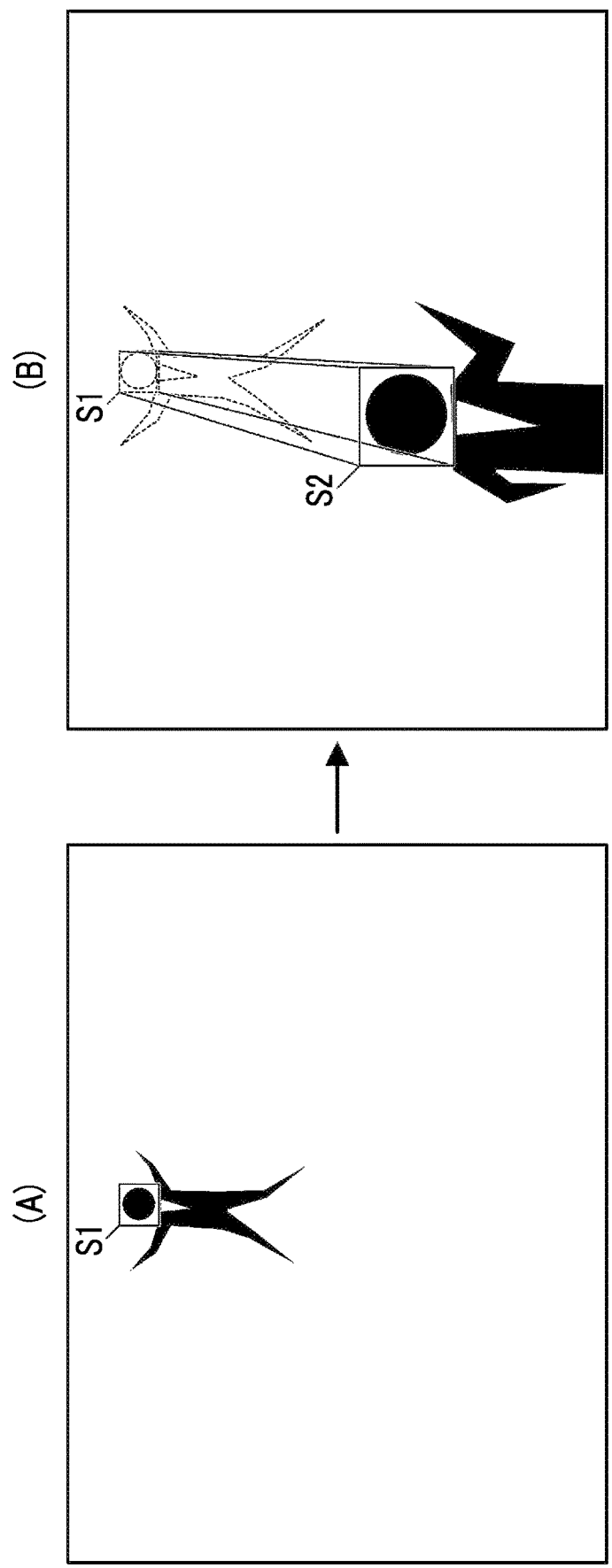
FIG. 9 is a conceptual diagram showing an example of measurement of a change amount in a size.

FIG. 9 is a conceptual diagram showing an example of the measurement of the change amount of the size. A portion (B) in FIG. 9 shows a captured image at a certain measurement point in time, and a portion (A) in FIG. 9 shows a captured image at the measurement point in time one period before.

The change amount of the size of the subject is measured, for example, as a change amount of the area of the bounding box BB that surrounds a subject which is a measurement target. For example, the area of the bounding box BB that surrounds the subject which is the measurement target at a certain measurement point in time is S2. In a case in which the area of the bounding box BB of the subject at the measurement point in time one period before is S1, the change amount of the size is calculated by S2/S1.

The phase difference change amount measurement unit 112C measures the change amount of the phase difference for each subject extracted by the subject extraction unit 110 at a predetermined measurement period. As described above, in the imaging apparatus 10 according to the present embodiment, the imaging element in which the phase difference pixel is incorporated is used. Therefore, the information on the phase difference for each subject can be acquired by processing the moving image data obtained by the imaging.

FIG. 10 is a conceptual diagram showing an example of the measurement of the change amount of the phase difference. A portion (B) in FIG. 10 shows a captured image at a certain measurement point in time, and a portion (A) in FIG. 10 shows a captured image at the measurement point in time one period before.

The example shown in FIG. 10 shows an example of a case in which the subject which is the measurement target is moved in a direction approaching the imaging apparatus 10. In this case, the subject distance is changed. Moreover, as the subject distance is changed, the phase difference is also changed. The change amount of the phase difference is calculated as a difference from the phase difference at the measurement point in time one period before.

It should be noted that, as described above, since the phase difference is changed according to the subject distance, detecting the phase difference is synonymous with detecting the subject distance.

The magnification candidate selection unit 114 selects the subject to be displayed in the selection screen of the subject from among a plurality of subjects extracted by the subject extraction unit 110. Based on the information on the change amounts of the position, the size, and the phase difference of each subject measured by the change amount measurement unit 112, the magnification candidate selection unit 114 selects the subject to be displayed (subject as the magnification candidate) in the selection screen of the subject. In the imaging apparatus according to the present embodiment, four subjects as the magnification candidates are displayed in the selection screen of the subject (see the portion (B) in FIG. 4), and four subjects are selected.

The selection of the subject is performed by calculating a priority degree for each subject extracted from the image and extracting four high-rank subjects having a high priority degree. The priority degree is calculated by, for example, the following expression.

Priority degree=$w1 \times$(change amount of position)+ $w2 \times$(change amount of size)+$w3 \times$(change amount of phase difference)$\times w3$ Here, w1, w2, and w3 are preset coefficients. That is, the priority degree of each subject is calculated by multiplying each of the change amount of the position, the change amount of the size, and the change amount of the phase difference by the predetermined coefficients w1, w2, and w3 to obtain the sum thereof.

By calculating the priority degree in this way and selecting the subject having a high priority degree as the magnification candidate, it is possible to select the subject as the magnification candidate, including at least the subject in which the change has occurred.

Figure 11:
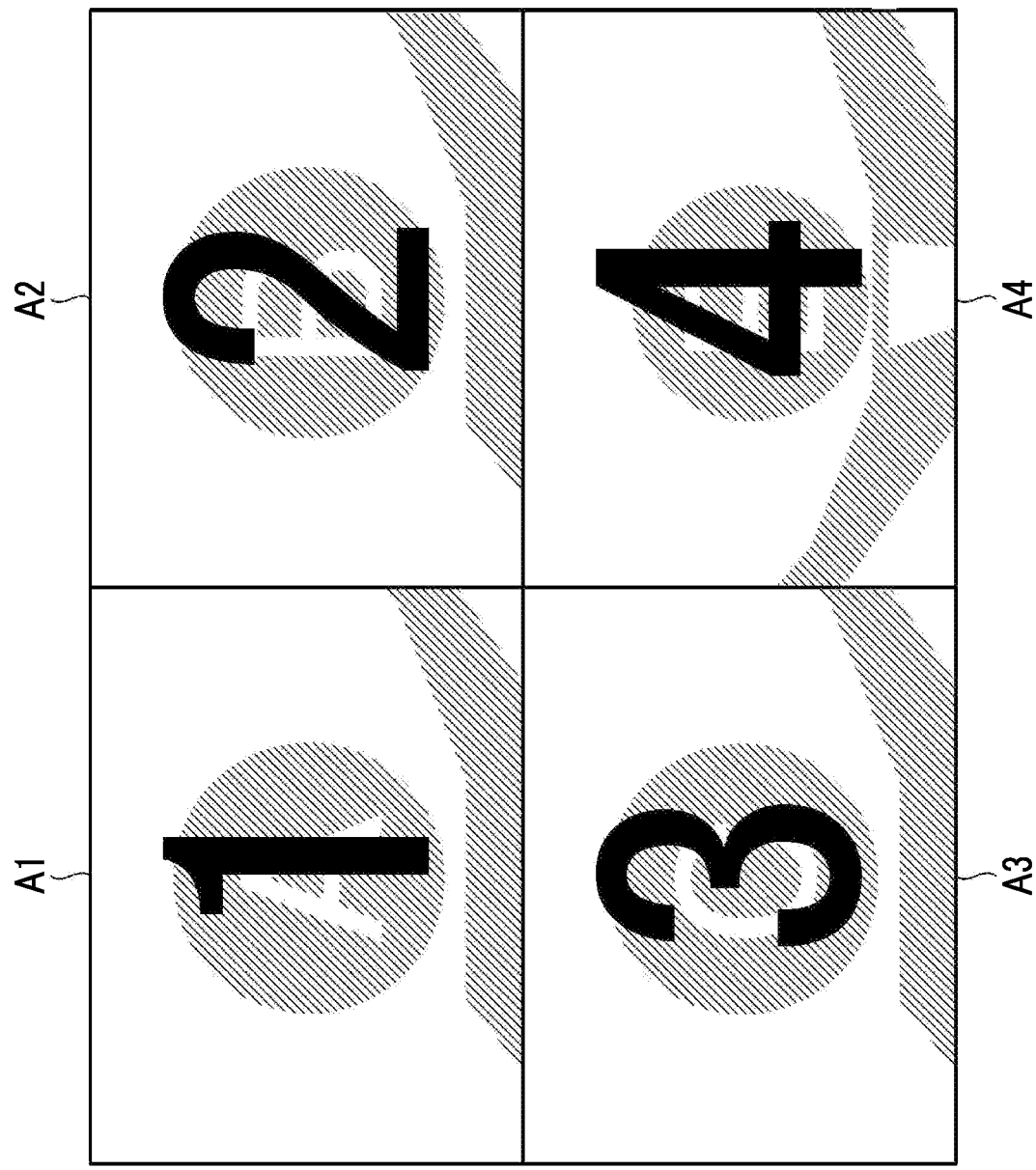
FIG. 11 is a diagram showing a relationship between a priority degree of the subject and a display position of the subject on a selection screen.

FIG. 11 is a diagram showing a relationship between the priority degree of the subject and the display position in the selection screen of the subject.

As described above, in the present embodiment, in the selection screen of the subject, one screen is divided into four equal parts, and the subject as the magnification candidate is magnified and displayed in each region. In the screen divided into four equal parts, an upper left region of the screen is a first display region A1, an upper right region of the screen is a second display region A2, a lower left region of the screen is a third display region A3, and a lower right region of the screen is a fourth display region A4. A subject having the first highest priority degree is displayed in the first display region A1, a subject having the second highest priority degree is displayed in the second display region A2, a subject having the third highest priority degree is displayed in the third display region A3, and a subject having the fourth highest priority degree is displayed in the fourth display region A4.

It should be noted that, in a case in which the priority degree is the same, for example, superiority or inferiority is determined according to the following determination rule. That is, the change amounts of the position are compared with each other, and the subject having a larger change amount of the position is superior. In a case in which the change amount of the position is also the same, the change amounts of the size are compared with each other next, and the subject having a larger change amount of the size is superior. In a case in which the change amount of the size is also the same, the change amounts of the phase difference are compared with each other next, and the subject having a larger change amount of the phase difference is superior. As described above, each item is compared in an order, and superiority or inferiority is determined. It should be noted that, in the present example, the example of the case has been described in which the superiority or inferiority is determined in an order of the position, the size, and the phase difference, but a configuration may be adopted in which the user can optionally set this order.

Based on the information on the change amounts of the position, the size, and the phase difference of each subject measured by the change amount measurement unit 112 and operation input information of the operation unit 22, the display switching determination unit 116 determines whether or not the display of the live view needs to be switched.

Here, the information on the change amounts of the position, the size, and the phase difference of each subject measured by the change amount measurement unit 112 is used for determining whether or not the switching to the selection screen of the subject is necessary.

On the other hand, the operation input information of the operation unit 22 is used for specifying the presence or absence of the selection of the subject and the selected subject in a case in which the switching to the selection screen of the subject is performed. The operation input information of the operation unit 22 is used for determining whether the tracking magnification display function is turned on or off.

Whether or not the switching to the selection screen of the subject is necessary is determined based on the presence or absence of the change in the subject. The presence or absence of the change in the subject is determined in the following manner.

Figure 12:
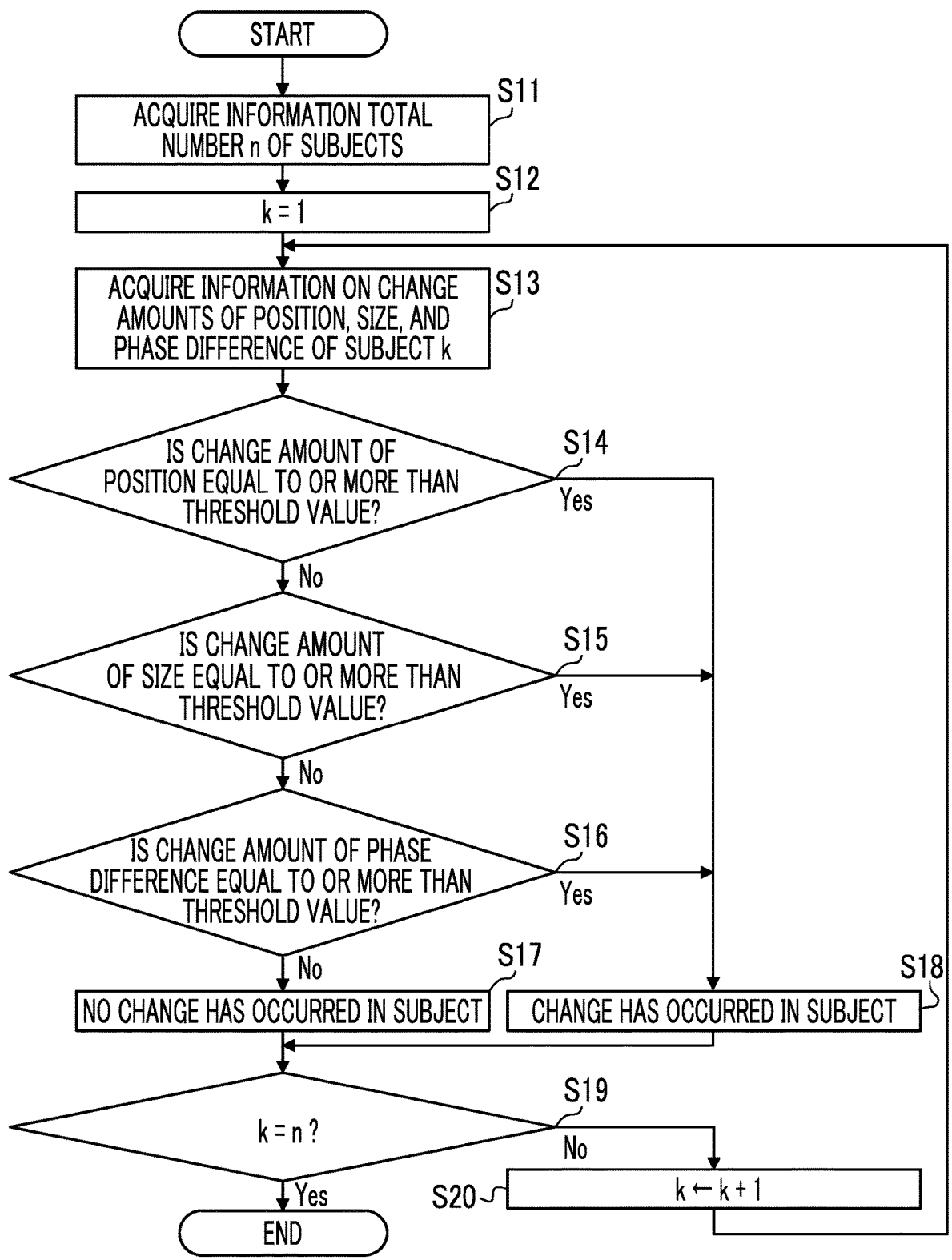
FIG. 12 is a flowchart showing an example of a procedure for determining the presence or absence of a change in the subject.

FIG. 12 is a flowchart showing an example of a procedure for determining the presence or absence of the change in the subject.

First, the subject extraction unit 110 acquires information on a total number n of the subjects extracted from the image (step S11).

Then, a value of k is set to 1 (step S12).

Then, the information on the change amounts of the position, the size, and the phase difference of the subject k is acquired (step S13). Here, the subject k is a number of the subject numbered by the subject extraction unit 110. In a case of k=1, the information on the change amounts of the position, the size, and the phase difference of the subject having a number 1 is acquired. Similarly, in a case of k=2, the information on the change amounts of the position, the size, and the phase difference of the subject having a number 2 is acquired.

Then, the change amount of the position of the subject k is compared with a threshold value (threshold value of the position), and it is determined whether or not the change amount is equal to or more than the threshold value (step S14). Information on the threshold value (information on the threshold value of the position) is stored in, for example, the ROM 26.

In a case in which the change amount of the position of the subject k is equal to or more than the threshold value (in a case of "Yes" in step S14), it is determined that the change has occurred in the subject (step S18).

On the other hand, in a case in which the change amount of the position of the subject k is less than the threshold value (in a case of "No" in step S14), the change amount of the size of the subject k is compared with a threshold value (threshold value of the size), and it is determined whether or not the change amount is equal to or more than the threshold value (step S15). Information on the threshold value (information on the threshold value of the size) is stored in, for example, the ROM 26.

In a case in which the change amount of the size of the subject k is equal to or more than the threshold value (in a case of "Yes" in step S15), it is determined that the change has occurred in the subject (step S18).

On the other hand, in a case in which the change amount of the size of the subject k is less than the threshold value (in a case of "No" in step S15), the change amount of the phase difference of the subject k is compared with a threshold value (threshold value of the phase difference), and it is determined whether or not the change amount is equal to or more than the threshold value (step S16). The information on the threshold value (information on the threshold value of the size) is stored in, for example, the ROM 26.

In a case in which the change amount of the phase difference of the subject k is equal to or more than the threshold value (in a case of "Yes" in step S16), it is determined that the change has occurred in the subject (step S18).

On the other hand, in a case in which the change amount of the phase difference of the subject k is less than the threshold value (in a case of "No" in step S16), it is determined that no change has occurred in the subject (step S17). This case is a case in which all the items of the position, the size, and the phase difference are less than the threshold value.

In a case in which it is determined whether or not the change has occurred in the subject, it is next determined whether or not the determination for all the subjects is completed. That is, it is determined whether or not k=n (step S19). n is the total number of the subjects extracted from the captured image. Therefore, in a case of k=n, it can be determined that the determination for all the subjects is completed. In this case (in a case of "Yes" in step S19), the processing of determining the presence or absence of the change in the subject ends.

In a case in which k=n, since the determination for all the subjects is not completed, 1 is added to the value of k (step S20), and the determination for the subject having the next number is made (returns to step S13).

After performing the determination processing described above to determine that the change has occurred in at least one subject, the display switching determination unit 116 determines that the switching to the selection screen of the subject is necessary. On the other hand, in a case in which it is determined that no change has occurred in all the extracted subjects, the display switching determination unit 116 determines that the switching to the selection screen of the subject is not necessary.

In a case in which the switching to the selection screen of the subject is performed, whether or not the subject to be magnified is selected is determined based on the operation input of the operation unit 22. In the present embodiment, the selection of the subject is performed on the touch panel. That is, by touching the regions (first display region A1 to fourth display region A4) in which the subject to be magnified is displayed, the subject to be magnified is selected.

In a case in which the selection is not performed within the defined time after the switching to the selection screen of the subject is performed, that is, in a case in which the touch to the touch panel is not detected, the display switching determination unit 116 determines that the selection of the subject is not performed. The defined time for performing the selection is an example of a first time.

It should be noted that, as described above, the magnification display function is turned on or off by the tracking magnification display button provided on the operation unit 22. The tracking magnification display button is configured by, for example, the press-type button, and the tracking magnification display function is turned on in a case in which the tracking magnification display button is pressed in a state in which the tracking magnification display function is turned off. In addition, in a case in which the tracking magnification display button is pressed in a state in which the tracking magnification display function is turned on, the tracking magnification display function is turned off.

In a case in which the tracking magnification display function is turned on, the selection of the target to be magnified on the image of the live view is received, and the selected subject is magnified and displayed (single magnification display) by itself. In this case, for example, a subject that can be selected is displayed by being surrounded with the bounding box (see FIG. 6). Therefore, by selecting the bounding box (touching the subject in the bounding box), the target to be magnified is selected.

Figure 13:
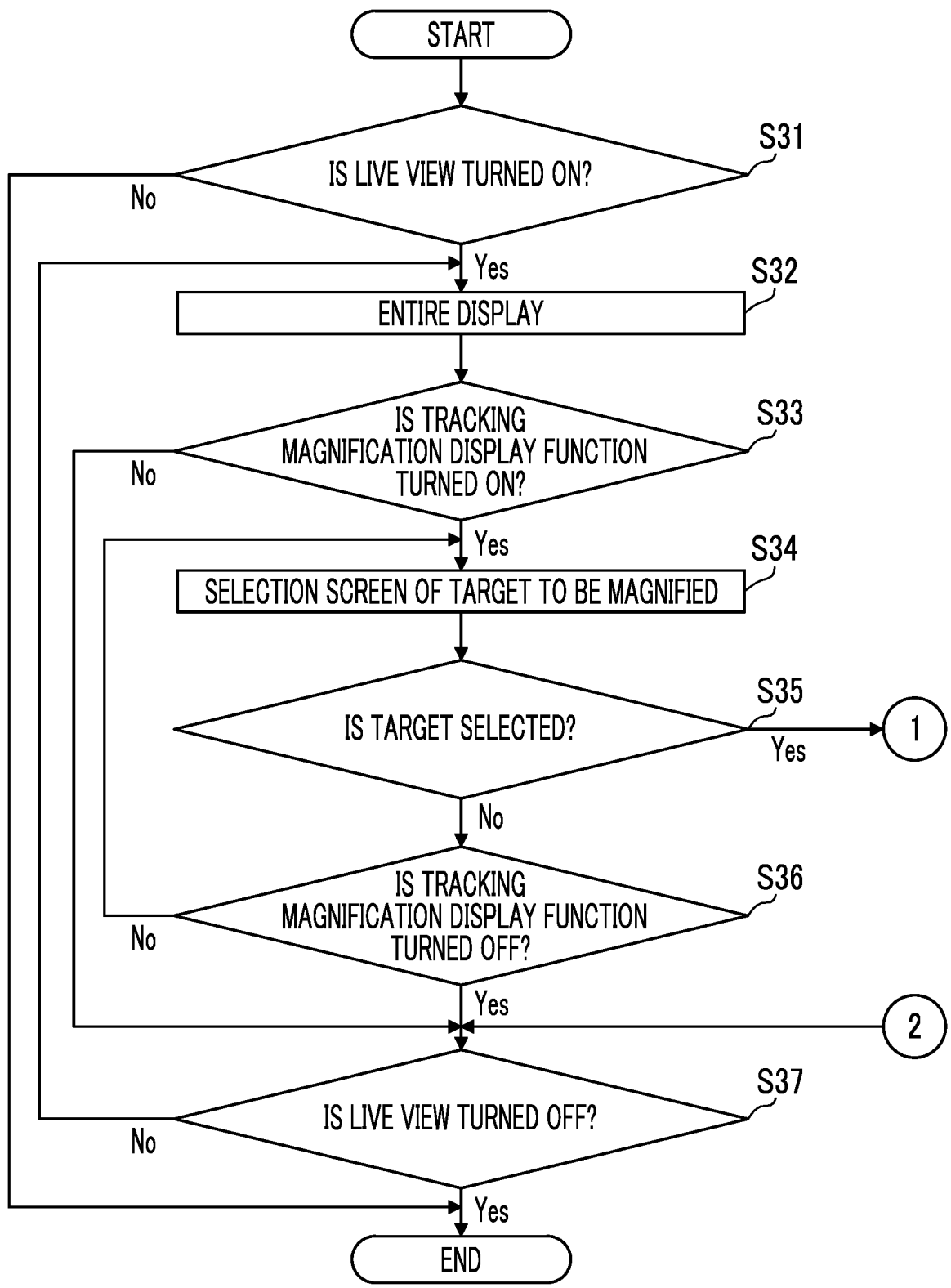
FIG. 13 is a flowchart showing a procedure for switching of display of the live view.
Figure 14:
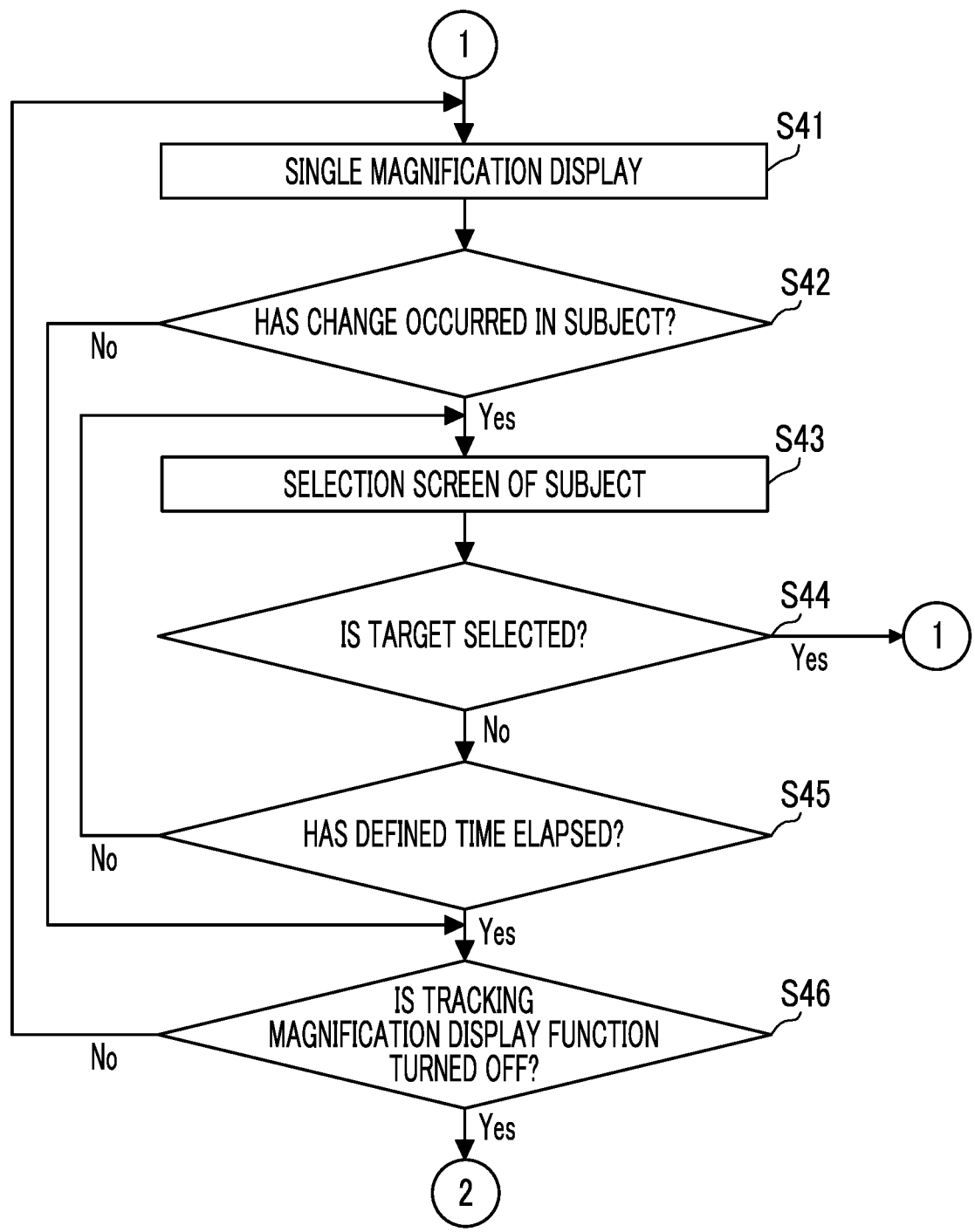
FIG. 14 is a flowchart showing the procedure for switching of the display of the live view.

FIGS. 13 and 14 are flowcharts showing procedures for the switching of the display of the live view.

First, it is determined whether the live view is turned on or off (step S31). The live view can be switched to be turned on or off by operating the live view button.

In a case in which the display of the live view is turned on (in a case of "Yes" in step S31), first, the entire display is performed as the live view (step S32). That is, the image captured by the imaging unit 14 is displayed as it is (see the portion (A) in FIG. 2).

In a state of the entire display, it is determined whether the tracking magnification display function is turned on or off (step S33). The tracking magnification display function can be switched to be turned on or off by operating the tracking magnification display button.

In a case in which the tracking magnification display function is turned off (in a case of "No" in step S33), it is determined whether the live view is turned on or off (step S37). In a case in which the display of the live view is turned off (in a case of "Yes" in step S37), the display of the live view ends. On the other hand, in a case in which the display of the live view is turned on (in a case of "No" in step S37), the entire display is continued (step S32).

In step S33, in a case in which the tracking magnification display function is turned on (in a case of "Yes"), the transition to the selection screen of the target to be magnified is performed (step S34). As described above, in the selection screen here, a subject that can be selected in the image of the live view of the entire display is displayed by being surrounded with the bounding box (see FIG. 6).

During the display of the selection screen of the target to be magnified, the presence or absence of the selection of the target to be magnified is determined (step S35). The selection of the target is performed via the touch panel. The user touches the subject in the bounding box displayed on the entire display screen to select the target to be magnified.

In a case in which no target is selected (in a case of "No" in step S35), it is determined whether the tracking magnification display function is turned on or off (step S36). In a case in which the tracking magnification display function is turned off (in a case of "Yes" in step S36), it is determined whether the display of the live view is turned on or off (step S37). In a case in which the display of the live view is turned off (in a case of "Yes" in step S37), the display of the live view ends. On the other hand, in a case in which the display of the live view is turned on (in a case of "No" in step S37), the switching to the normal entire display is performed (step S32). That is, the switching to the entire display in a state in which the bounding box is not displayed is performed.

In step S35, in a case in which the target is selected (in a case of "Yes"), the switching to the display (single magnification display) in which the selected subject is magnified by itself is performed (see the portion (B) in FIG. 2) (step S41).

As shown in FIG. 14, in a case of the switching to the single magnification display, the presence or absence of the change in the subject is determined (step S42).

In a case in which no change has occurred in the subject (in a case of "No" in step S42), it is determined whether the tracking magnification display function is turned on or off (step S46).

In a case in which the tracking magnification display function is turned off (in a case of "Yes" in step S46), as shown in FIG. 13, it is determined whether the display of the live view is turned on or off (step S37). In a case in which the display of the live view is turned off (in a case of "Yes" in step S37), the display of the live view ends. On the other hand, in a case in which the display of the live view is turned on (in a case of "No" in step S37), the switching to the normal entire display is performed (step S32).

In a case in which the tracking magnification display function is turned on (in a case of "No" in step S46), as shown in FIG. 14, the single magnification display is continued for the same subject (step S41).

In step S42, in a case in which the change has occurred in the subject (in a case of "Yes"), the single magnification display is switched to the selection screen of the subject (step S43). As described above, in the selection screen of the subject, the subject as the magnification candidate is magnified and displayed in each display region of the screen divided into four equal parts (see the portion (B) in FIG. 4).

In a case in which the switching to the selection screen of the subject is performed, the presence or absence of the selection of the target to be magnified is determined (step S44). The user touches the display region in which the subject desired to be magnified is displayed, and selects the subject to be magnified. By the selection operation, an instruction to change the target to be magnified is given. It should be noted that, in a case in which the subject that has been displayed in the single magnification display is included in the candidate image, in a case in which the subject that has been displayed in the single magnification display is selected, the subject is not substantially changed, but is included in the instruction to change here.

In a case in which the selection of the subject is performed in the selection screen of the subject (in a case of "Yes" in step S44), the switching to the magnification display (single magnification display) in which the selected subject is magnified by itself is performed (see the portion (C) in FIG. 4) (step S41).

On the other hand, in a case in which the selection of the subject is not performed (in a case of "No" in step S44), it is determined whether or not the defined time has elapsed after the switching to the selection screen of the subject (step S45). In a case in which the defined time has not elapsed, the selection screen of the subject is continued (step S43).

On the other hand, in a case in which the defined time has elapsed (in a case of "Yes" in step S44), it is determined whether the tracking magnification display function is turned on or off (step S46). In a case in which the tracking magnification display function is turned on (in a case of "No" in step S46), the selection screen of the subject is switched to the original single magnification display (step S41). That is, the subject that has been magnified and displayed before switching to the selection screen of the subject is switched to the magnification display by itself.

In this way, after the switching to the single magnification display, in a case in which the change being equal to or more than the predetermined amount is observed in the subject being imaged, the transition to the selection screen of the subject is automatically performed. Then, in a case in which the subject is selected within the defined time in the selection screen of the subject, the selected subject is displayed in the single magnification display. On the other hand, in a case in which the selection of the subject is not performed within the defined time, the original single magnification display is restored.

Since the display is automatically switched in this way, the user can concentrate on the operation of the focus adjustment even in a case in which the manual focus adjustment is performed. As a result, it is possible to improve the operability in a case in which the manual focus adjustment is performed.

The display moving image data generation unit 118 generates the moving image data for display to be output to the display unit 16 based on a determination result of the display switching by the display switching determination unit 116. The moving image data for display includes moving image data for the entire display, moving image data for single magnification display, and moving image data for the selection screen of the subject in a case of the single magnification display. In addition, the moving image data for the selection screen of the subject includes moving image data for initial selection and moving image data for subject switching. The moving image data for initial selection is moving image data to be displayed in a case in which the tracking magnification display function is turned on. That is, the moving image data for initial selection is the moving image data for selecting the subject to be first displayed in the single magnification display. As described above, as the moving image data, the image in which the subject that can be selected in the image of the entire display is surrounded with the bounding box is generated (see FIG. 6). The moving image data for subject switching is moving image data to be displayed in a case in which the change being equal to or more than the predetermined amount has occurred in the subject being imaged, during the single magnification display. As described above, as the moving image data, one screen is divided into four equal parts, and the image in which the subject selected as the magnification candidate is magnified and displayed in each display region is generated (see the portion (B) in FIG. 4 ad FIG. 11).

The moving image data for subject switching is an example of second moving image data, and constitutes the moving image data in which the region of each of the plurality of subjects is magnified.

In addition, the moving image data for single magnification display before switching to the moving image data for subject switching is an example of first moving image data, and constitutes the moving image data in which the region including the specific subject among the plurality of subjects is magnified.

In addition, the moving image data for single magnification display after the subject is switched is an example of third moving image data, and constitutes the moving image data in which the region including the subject selected as the target to be magnified is magnified.

[Transition of Display of Live View]

Figure 15:
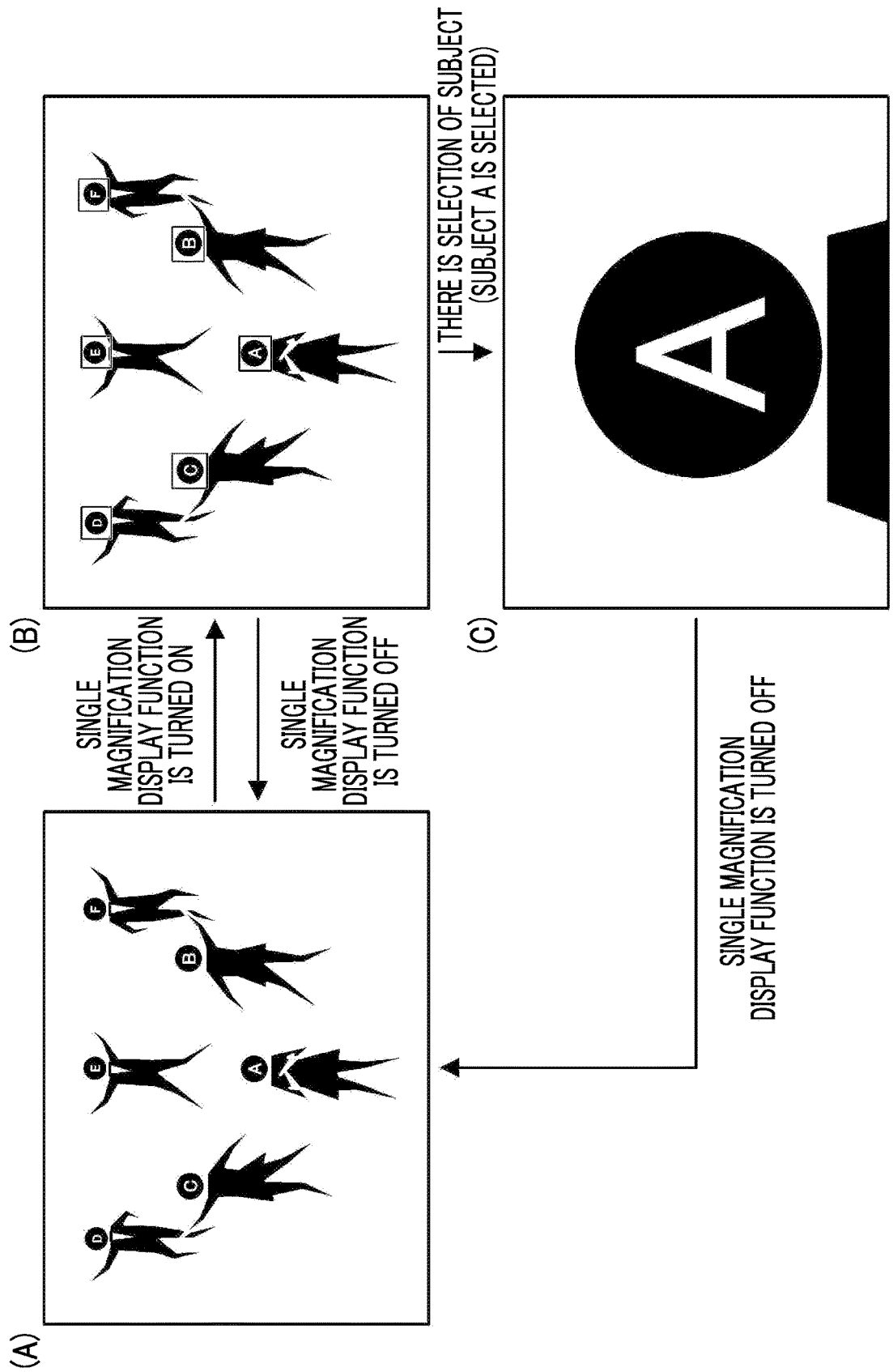
FIG. 15 is a diagram showing an example of transition of the display of the live view.
Figure 16:
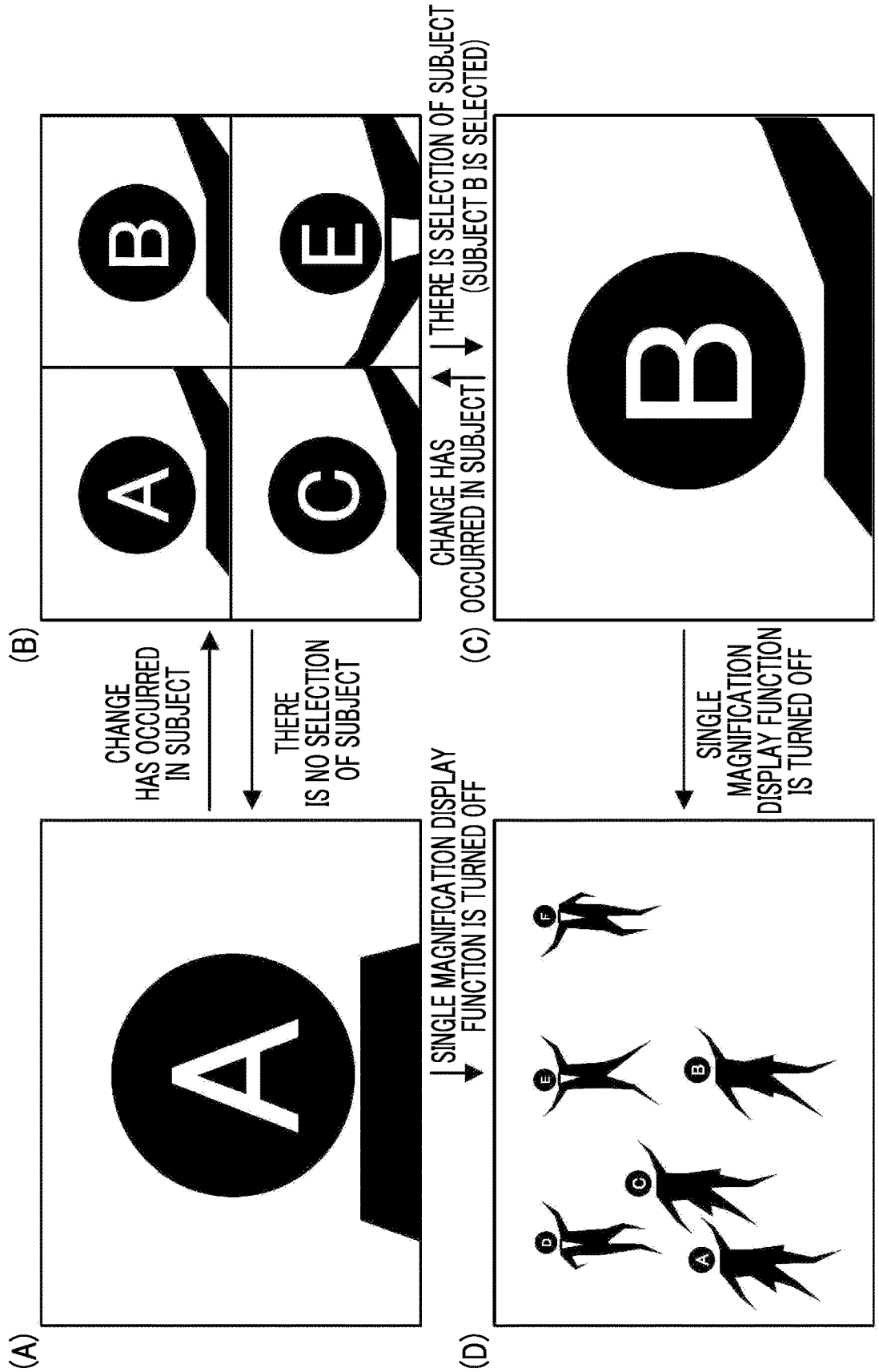
FIG. 16 is a diagram showing an example of transition of the display of the live view.

FIGS. 15 and 16 are diagrams showing examples of the transition of the display of the live view.

In a case in which the display of the live view is turned on, first, as shown in a portion (A) in FIG. 15, the entire display is performed. In a case in which the tracking magnification display function is turned on during the entire display, the transition to the selection screen of the subject to be displayed in the single magnification display is performed, as shown in a portion (B) in FIG. 15. The user selects the subject to be displayed in the single magnification display in the selection screen of the subject. The subject selected here is an example of a specific subject. The selection is performed by touching the target on the screen. In a case in which the subject to be displayed in the single magnification display is selected, the selected subject (specific subject) is magnified and displayed by itself as shown in a portion (C) in FIG. 15 (and a portion (A) in FIG. 16). That is, the single magnification display is performed. It should be noted that the portion (C) in FIG. 15 shows an example of a case in a case in which the subject A is selected. Thereafter, the single magnification display of the selected subject is performed. The moving image data displayed in the single magnification display is an example of first moving image data.

During the single magnification display, the change in the subject during the imaging is measured in the predetermined measurement period, and in a case in which the change being equal to or more than the predetermined amount has occurred, the switching to the selection screen of the subject is performed as shown in a portion (B) in FIG. 16. In the selection screen of the subject, four subjects, which are the magnification candidates, are magnified and displayed in each display region divided into four equal parts. The display in each display region is performed following the movement of the subject. That is, in each display region, the image is displayed in which each subject is positioned at the center (substantially the center) of each display region and magnified. The moving image data for the selection screen of the subject is an example of second moving image data.

The user selects the subject to be displayed in the single magnification display in the selection screen of the subject. The selection is performed by touching the target on the screen. The instruction to change the target is given by selecting the subject to be displayed in the single magnification display.

In a case in which the selection of the target is performed, as shown in a portion (C) in FIG. 16, the selected subject is displayed in the single magnification display. It should be noted that the portion (C) in FIG. 16 shows an example of a case in which the subject B (subject in the display region in the upper right of the selection screen of the subject) is selected. Thereafter, the single magnification display of the selected subject is performed. The moving image data after the change, which is displayed in the single magnification display, is an example of third moving image data.

Even after the target is changed, during the single magnification display, the change in the subject during the imaging is measured in the predetermined measurement period, and in a case in which the change being equal to or more than the predetermined amount has occurred, the switching to the selection screen of the subject is performed as shown in the portion (B) in FIG. 16.

In addition, in a case in which the tracking magnification display function is turned off during the single magnification display, the switching to the entire display is performed as shown in a portion (D) in FIG. 16.

As described above, in the imaging apparatus 10 according to the present embodiment, in a case in which the specific subject is tracked, magnified, and displayed, in a case in which the change being equal to or more than the predetermined amount has occurred in the subject being imaged, the transition to the selection screen of the subject is automatically performed. Then, in a case in which the subject is selected in the selection screen of the subject, the selected subject is displayed in the single magnification display. On the other hand, in a case in which the defined time has elapsed without selecting the subject in the selection screen of the subject, the original single magnification display is restored. As a result, the user can concentrate on the operation of the focus adjustment even in a case in which the manual focus adjustment is performed.

Second Embodiment

In the imaging apparatus according to the embodiment described above, in a case of switching the display from the single magnification display to the selection screen of the subject, the changes in the position, the size, and the phase difference of the subject during the imaging are used as a trigger. In the imaging apparatus according to the present embodiment, a configuration is adopted in which the user can optionally set the change in the subject as a trigger for the switching of the display. That is, a configuration is adopted in which the user can optionally set a condition for determining whether or not the change has occurred in the subject. For example, a configuration is adopted in which the user can optionally set a configuration in which the display is switched from the single magnification display to the selection screen of the subject by using only the change in the position as the trigger, or a configuration in which the display is switched from the single magnification display to the selection screen of the subject by using only the changes in the position and the size as the trigger. In the imaging apparatus according to the present embodiment, the trigger for the switching of the display is set on a predetermined setting screen.

Figure 17:
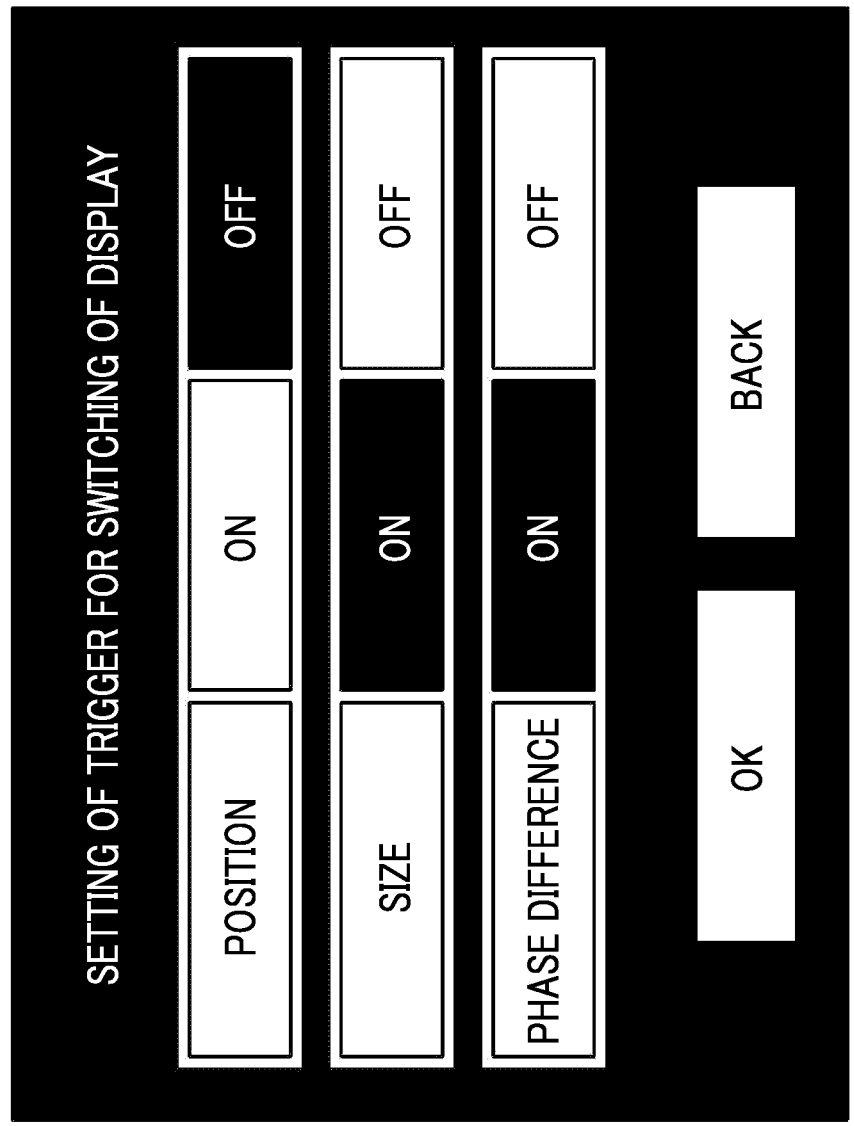
FIG. 17 is a diagram showing an example of a setting screen of a trigger of the switching of the display.

FIG. 17 is a diagram showing an example of the setting screen of the trigger for the switching of the display.

The setting screen is called from, for example, a menu screen. As shown in FIG. 17, "ON" and "OFF" buttons are displayed for each item of "position", "size", and "phase difference". The "ON" and "OFF" buttons are alternatively selected. In the example shown in FIG. 17, the button on a white background is the selected button. Therefore, in the example shown in FIG. 17, the item of "position" is set to "ON", the item of "size" is set to "OFF", and the item of "phase difference" is set to "OFF". In this case, the display is switched from the single magnification display to the selection screen of the subject by using only the change in the position as the trigger.

The CPU 24 receives a change in the setting based on the operation input from the operation unit 22 (touch panel). The set information is stored in the storage unit 18.

The display switching determination unit 116 determines the presence or absence of the change in the subject according to the set information, and determines whether or not the switching to the selection screen of the subject is necessary. For example, in a case in which only the item of the position is turned on, in the flowchart shown in FIG. 12, the processing of step S15 (processing of determining whether or not the change amount of the size is equal to or more than the threshold value) and the processing of step S16 (processing of determining whether or not the change amount of the phase difference is equal to or more than the threshold value) are skipped.

In this way, by adopting the configuration in which the user can optionally set the change in the subject as the trigger, it is possible to prevent unnecessary switching of the display according to the user. As a result, the operability can be further improved.

It should be noted that, in the embodiment described above, the configuration is adopted in which the change in the position, the change in the size, and the change in the phase difference (subject distance) are measured as the change in the subject, but a configuration may be adopted in which other changes are measured instead of or in addition to the position, the change in the size, and the change in the phase difference (subject distance).

In addition, in the embodiment described above, the configuration is adopted in which it is determined that the change has occurred in the subject in a case in which the change being equal to or more than the predetermined amount has occurred in at least one of the position, the size, or the phase difference (subject distance) of the subject, but a configuration can also be adopted in which the presence or absence of the change in the subject is determined by combining a plurality of changes. For example, a configuration can be adopted in which it is determined that the change has occurred in the subject in a case in which the change amount of the position is equal to or more than the threshold value and the change amount of the size is equal to or more than the threshold value.

Third Embodiment

In the imaging apparatus according to the second embodiment, the configuration is adopted in which the user can optionally set the condition for determining whether or not the change has occurred in the subject. In the imaging apparatus according to the present embodiment, a condition for determination is automatically optimized based on a selection tendency of the user in the past. For example, in a case in which the display is switched a plurality of times based on the change in the position, in a case in which the selection of the subject (switching of the subject) is not performed even once, it is considered that the user does not want to switch the display based on the change in the position. Therefore, in this case, the setting is set in which the change in the subject is not detected based on the change in the position. As a result, it is possible to prevent unnecessary switching of the display, and it is possible to further improve the operability. Hereinafter, a configuration will be described in which the condition for determination is automatically optimized based on the selection tendency of the user in the past.

Figure 18:
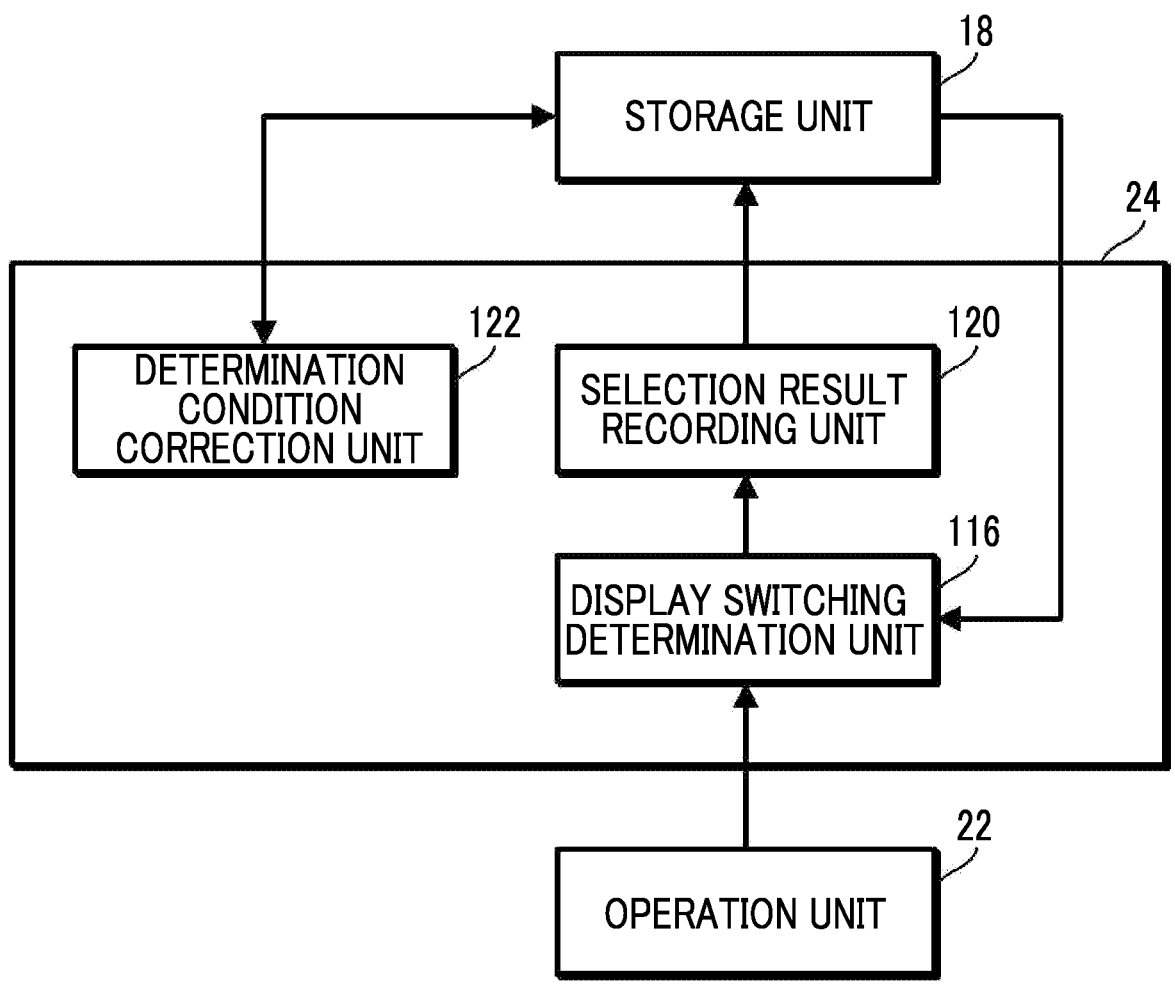
FIG. 18 is a block diagram showing an example of a function realized by the CPU in a case in which a condition for determining whether or not the change has occurred in the subject is automatically optimized.

FIG. 18 is a block diagram showing an example of a function realized by the CPU in a case in which the condition for determining whether or not the change has occurred in the subject is automatically optimized.

As shown in FIG. 18, in order to automatically optimize the condition for determining whether or not the change has occurred in the subject, the CPU 24 further functions as a selection result recording unit 120 and a determination condition correction unit 122.

The selection result recording unit 120 records a selection result of the subject in a case of the switching from the single magnification display to the selection screen of the subject in the storage unit 18. As the selection result, the information on the item of the change in the subject as the trigger for the switching of the display and the information on the presence or absence of the selection are recorded in association with each other. The selection result is recorded in the storage unit 18 as selection history data. The selection history data is updated each time the selection screen of the subject is displayed.

The determination condition correction unit 122 corrects the condition for determining whether or not the change has occurred in the subject based on the selection history data. The correction is performed, for example, in the following manner. That is, a switching rate R of the subject is calculated, and the item in which the switching rate R of the subject is equal to or less than a threshold value is excluded from the condition for determining the presence or absence of the change in the subject. Here, in a case in which, based on the change in the item which is a calculation target, the number of times of the switching from the single magnification display to the selection screen of the subject is N and the number of times of switching of the subject (the number of times of selection of the subject in the selection screen of the subject) is n, the switching rate R of the subject is calculated by R=n/N. That is, an item in which a rate at which the subject is actually switched is equal to or less than a predetermined value is excluded from the condition for determining the presence or absence of the change in the subject.

Figure 19:
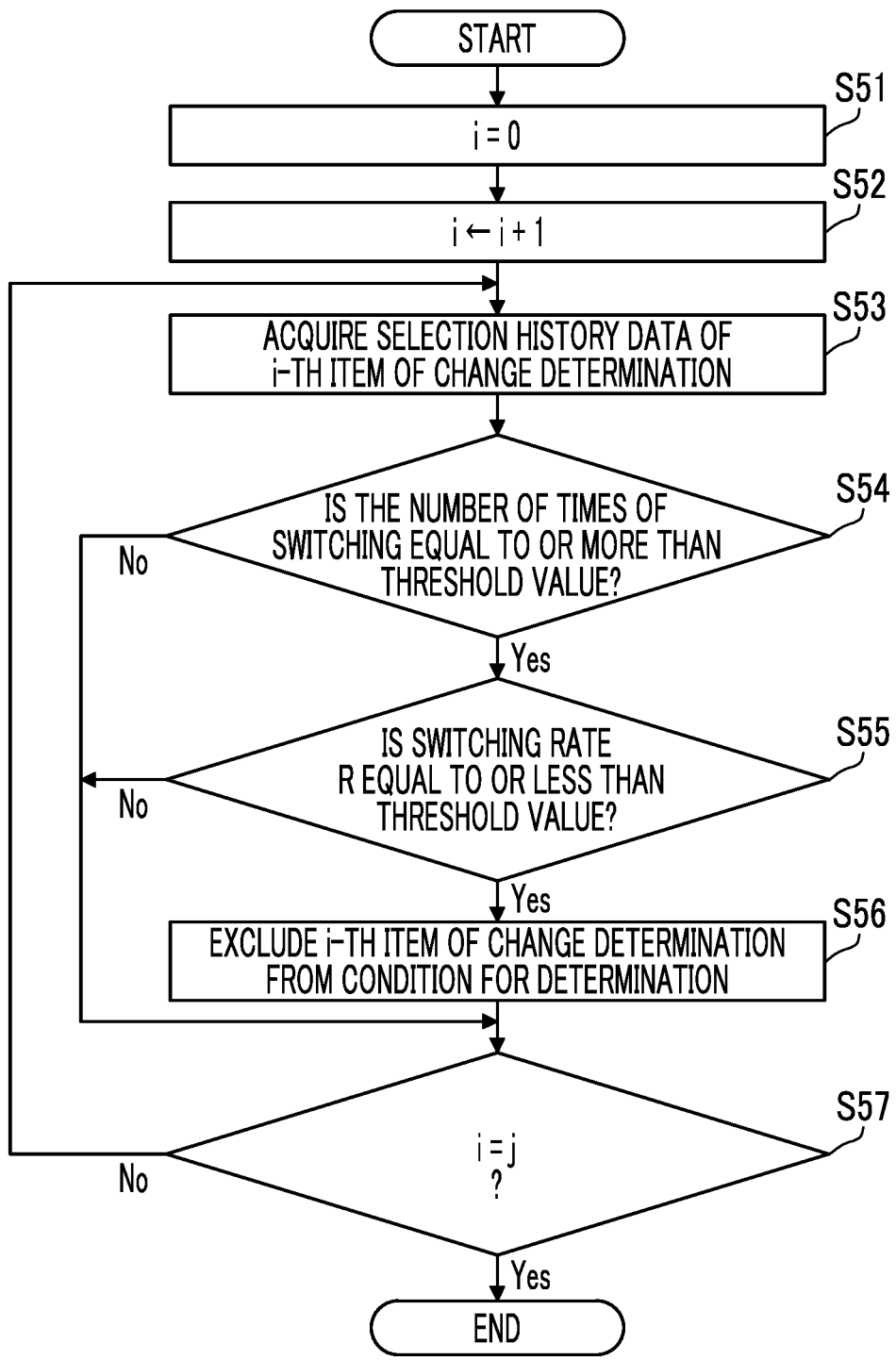
FIG. 19 is a flowchart showing a procedure for correcting the condition for determining whether or not the change has occurred in the subject.

FIG. 19 is a flowchart showing a procedure for correcting the condition for determining whether or not the change has occurred in the subject.

Here, as the condition for determining that the change has occurred in the subject, a condition is set in which the change amount of at least one of the position, the size, or the phase difference is equal to or more than the threshold value. The item of the position is used as a first item of the change determination, the item of the size is used as a second item of the change determination, and the item of the phase difference is used as a third item of the change determination.

As shown in FIG. 19, first, a variable i is set to 0 (step S51). Then, 1 is added to a value of i (step S52). Then, the selection history data of the i-th item of the determination of the change is acquired (step S53). For example, in a case of i=1, the selection history data of the item of the position is acquired.

Then, regarding the i-th item of the change determination, it is determined whether or not the number of times of switching is equal to or more than the threshold value (step S54). Here, the number of times of switching is the number of times (total number) of the switching from the single magnification display to the selection screen of the subject based on the i-th item of the change determination. In a case in which the number of times of switching is less than the threshold value (threshold value of the number of times of switching), the i-th item is excluded from a correction target of this time. That is, in this case, it is determined that sufficient data is not obtained for grasping the selection tendency, and the i-th item is excluded from the correction target. In a case in which the number of times of switching is less than the threshold value (in a case of "No" in step S54), the processing proceeds to step S57. For example, in a case in which the threshold value of the number of times of switching is set to 15 times, in a case in which the number of times of switching of the i-th item of the change determination is less than 15 times, the i-th item is excluded from the correction target of this time.

In a case in which the number of times of switching is equal to or more than the threshold value (in a case of step S54 is "Yes") regarding the i-th item of the change determination, then it is determined whether or not the switching rate R is equal to or less than the threshold value. In a case in which the switching rate R is equal to or less than the threshold value (threshold value of the switching rate R) (in a case of "Yes" in step S55), the i-th item is excluded from the condition for determining the presence or absence of the change in the subject (step S56). That is, in this case, since the subject is not selected (switched) even though the display is switched, the i-th item is excluded from the condition for determining whether or not the change has occurred in the subject. For example, in a case in which the threshold value of the switching rate R is set to 5%, in a case in which the switching rate R in a case in which the display is switched based on the i-th item of the change determination is equal to or less than 5%, the i-th item of the change determination is excluded from the condition for determining the presence or absence of the change in the subject.

On the other hand, in a case in which the switching rate R exceeds the threshold value (threshold value of the switching rate) (in a case of "No" in step S55), it is determined whether or not the variable i has the same value as j (i=j) (step S57). j is the total number of determination items. In a case in which the determination items are the position, the size, and the phase difference, j=3. That is, it is determined whether or not the correction processing ends for all the items. In a case in which the processing ends for all the items, the correction processing of the condition for determining the presence or absence of the change in the subject ends.

FIG. 20 is a table showing an example of the number of times of switching and the switching rate for each item of the change determination.

FIG. 20 shows an example of a case of the switching from the single magnification display to the selection screen of the subject based on the changes in the position, the size, and the phase difference of the subject.

In the example shown in FIG. 20, the number of times of switching of the display (the number of times of switching) based on the change in the position is 30 times, and the rate (switching rate) at which the selection (switching) of the subject is performed in a case in which the display is switched based on the change in the position is 0%. In addition, the number of times of switching of the display (the number of times of switching) based on the change in the size is 20 times, and the rate (switching rate) at which the selection (switching) of the subject is performed in a case in which the display is switched based on the change in the size is 60%. In addition, the number of times of switching of the display (the number of times of switching) based on the change in the phase difference is 10 times, and the rate (switching rate) at which the selection (switching) of the subject is performed in a case in which the display is switched based on the change in the phase difference is 3%.

Here, in a case in which the threshold value of the number of times of switching is 15 times and the threshold value of the switching rate is 5%, the phase difference is excluded from the correction target because the number of times of switching is less than the threshold value of the number of times of switching. That is, the phase difference is used as it is as the condition for determination.

On the other hand, since the number of times of switching exceeds the threshold value of the number of times of switching, the position and the size are the correction target. The size is used as it is as the condition for determination because the switching rate exceeds the threshold value of the switching rate. On the other hand, since the switching rate of the position is equal to or less than the threshold value of the switching rate, the position is excluded from the condition for determining the presence or absence of the change in the subject.

In this way, the determination condition correction unit 122 corrects the condition for determining the presence or absence of the change in the subject, based on the switching rate R calculated from the past selection history. The information on the corrected condition is stored in the storage unit 18. The display switching determination unit 116 determines the presence or absence of the change in the subject according to the information of the condition recorded in the storage unit 18, and determines whether or not the switching to the selection screen of the subject is necessary.

As described above, with the imaging apparatus according to the present embodiment, the condition for determining the presence or absence of the change in the subject is automatically optimized. As a result, it is possible to prevent unnecessary switching of the display. In addition, since the setting is automatically performed, the convenience can be improved.

Fourth Embodiment

In the imaging apparatus according to the present embodiment, a configuration is adopted in which the user can adjust the threshold value used for determining whether or not the change has occurred in the subject. That is, a configuration is adopted in which the user can freely raise or lower a setting of the threshold value. In the imaging apparatus according to the present embodiment, a configuration is adopted in which the adjustment is performed in a predetermined setting screen.

Figure 21:
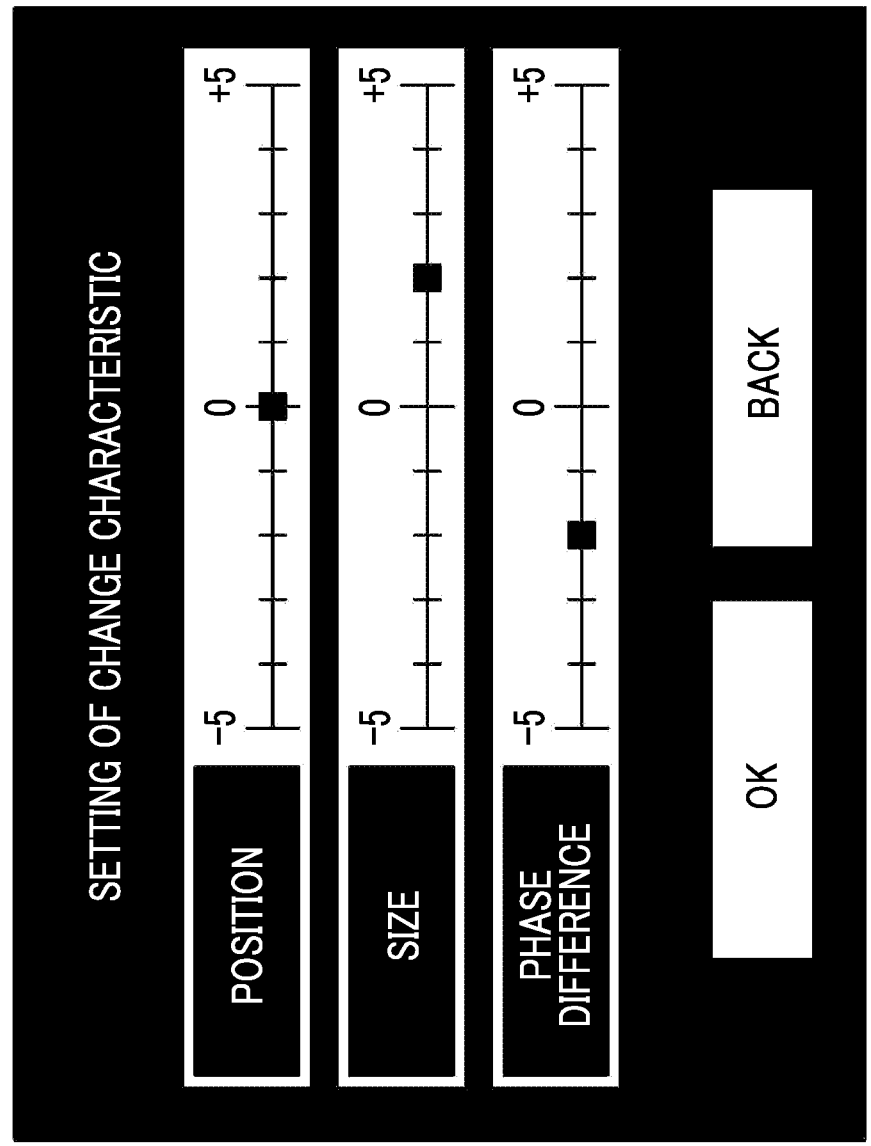
FIG. 21 is a diagram showing an example of a screen for adjusting a setting of a threshold value.

FIG. 21 is a diagram showing an example of the screen for adjusting the setting of the threshold value.

FIG. 21 shows an example of a case in which the setting of the threshold value of each item of the position, the size, and the phase difference of the subject is adjusted as a setting of a change characteristic. The setting screen is called from, for example, the menu screen.

As shown in FIG. 21, on the setting screen of the present example, a lever for adjustment of the change characteristic is individually displayed for each item of "position", "size", and "phase difference". The lever for adjustment is configured to be adjusted in five levels on a plus side and a minus side with "0" as the center. In a case in which the lever is set to the "0" position, the threshold value is set to a default value. In a case in which the lever is moved from the "0" position to the plus side, the threshold value is gradually raised by a predetermined change amount. On the other hand, in a case in which the lever is moved from the "0" position to the minus side, the threshold value is gradually lowered by the predetermined change amount. Therefore, for example, in a case of raising the reaction (sensitivity) (in a case of determining that the change has occurred with a smaller change amount), the lever is moved from the "0" position to the minus side. On the contrary, in a case in which the reaction is lowered (in a case of it is determined that the change has occurred with a larger change amount), the lever is moved from the "0" position to the plus side.

For example, in a case in which the reaction is raised for the change in the position and the reaction is lowered for the size and the phase difference, the lever for the "position" is moved to the minus side, and the levers for the "size" and the "phase difference" are moved to the plus side. As a result, the threshold value for the position is lowered with respect to the default value, and the threshold values for the size and the phase difference are raised with respect to the default value.

The set information is stored in the storage unit 18. The display switching determination unit 116 determines the presence or absence of the change in the subject according to the set information, and determines whether or not the switching to the selection screen of the subject is necessary.

In this way, by adopting the configuration in which the setting of the threshold value can be freely adjusted by the user, it is possible to appropriately switch the display according to an imaging scene or the like. As a result, the operability can be further improved.

It should be noted that, in the present embodiment, as an example, the case has been described in which the user manually adjusts the setting of the threshold value, but a configuration may be adopted in which the threshold value is automatically adjusted, as in the imaging apparatus according to the third embodiment. For example, a configuration can be adopted in which the switching rate is calculated individually for each item and the threshold value of the item in which the calculated switching rate is equal to or less than the threshold value (threshold value of the switching rate) is raised by a predetermined amount. Alternatively, a configuration can be adopted in which the threshold value is changed according to the switching rate. For example, a configuration can be adopted in which the threshold value is raised as the switching rate is lowered.

Fifth Embodiment

In the imaging apparatus according to the first embodiment, the configuration is adopted in which, as the selection screen of the subject, one screen is divided into four equal parts, and the subject as the magnification candidate is magnified and displayed in each region.

In the imaging apparatus according to the present embodiment, the entire image is displayed in one of the display regions divided into four equal parts. The entire image is an image in which the entire image captured by the imaging unit 14 is displayed, and is an image that is displayed during the normal live view.

Figure 22:
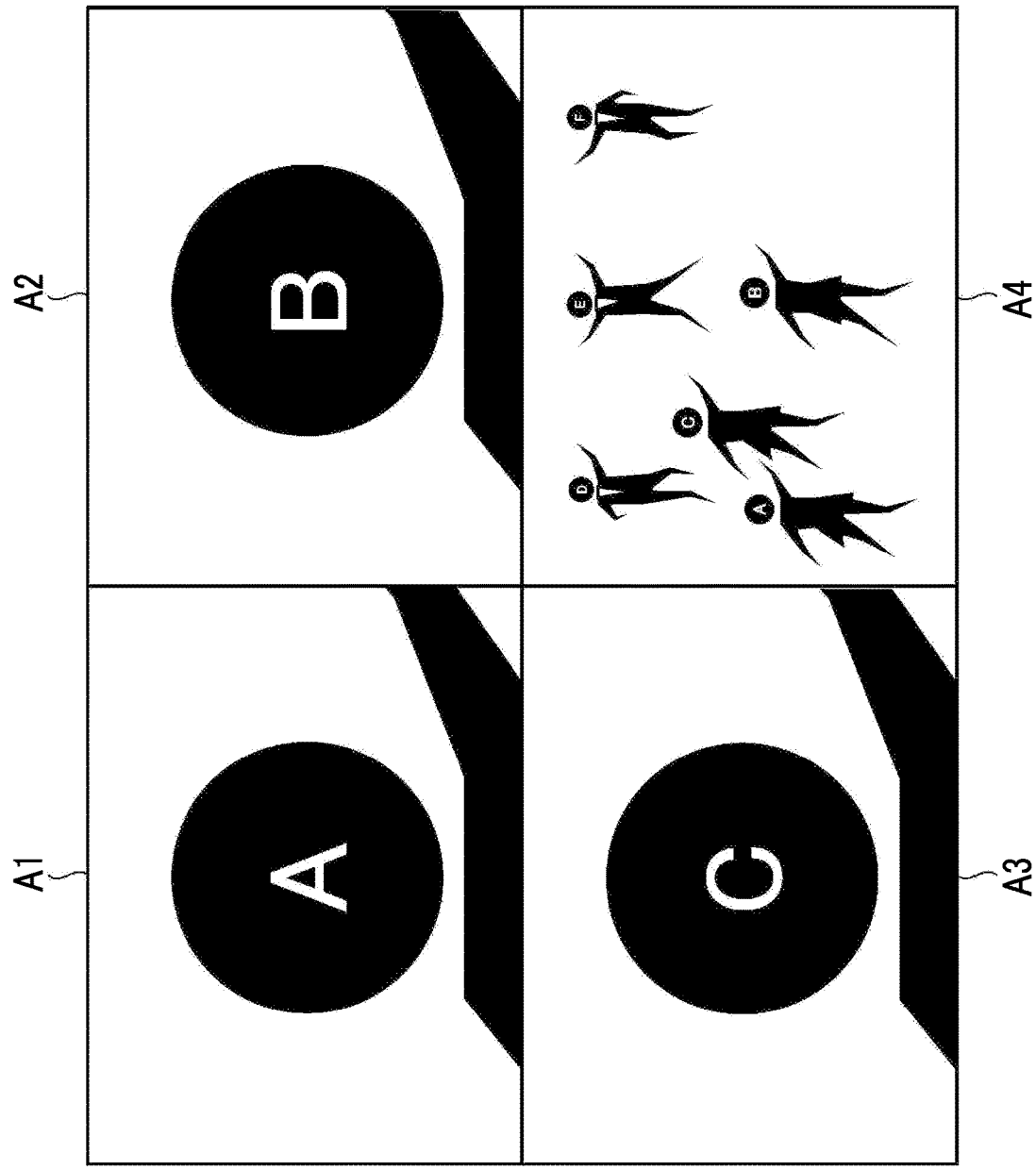
FIG. 22 is a diagram showing an example of the selection screen of the subject displayed by the imaging apparatus according to the present embodiment.

FIG. 22 is a diagram showing an example of the selection screen of the subject displayed by the imaging apparatus according to the present embodiment. FIG. 22 shows an example in a case in which one screen is divided into four equal parts.

As shown in FIG. 22, in the screen divided into four equal parts, the entire image is displayed in the fourth display region A4 at the lower right.

In this case, in the magnification candidate selection unit 114, three subjects are selected as the magnification candidates in descending order of the priority degree. Among the three selected subjects, a subject having the first highest priority degree is displayed in the first display region A1, a subject having the second highest priority degree is displayed in the second display region A2, and a subject having the third highest priority degree is displayed in the third display region A3.

The display moving image data generation unit 118 generates moving image data having the configuration shown in FIG. 21 as the moving image data for subject switching (moving image data for the selection screen of the subject).

In this way, by displaying the entire image on a part of the selection screen of the subject, it is possible to obtain a bird's-eye view of the entire image and it is possible to facilitate the selection of the subject.

Modification Example

Figure 23:
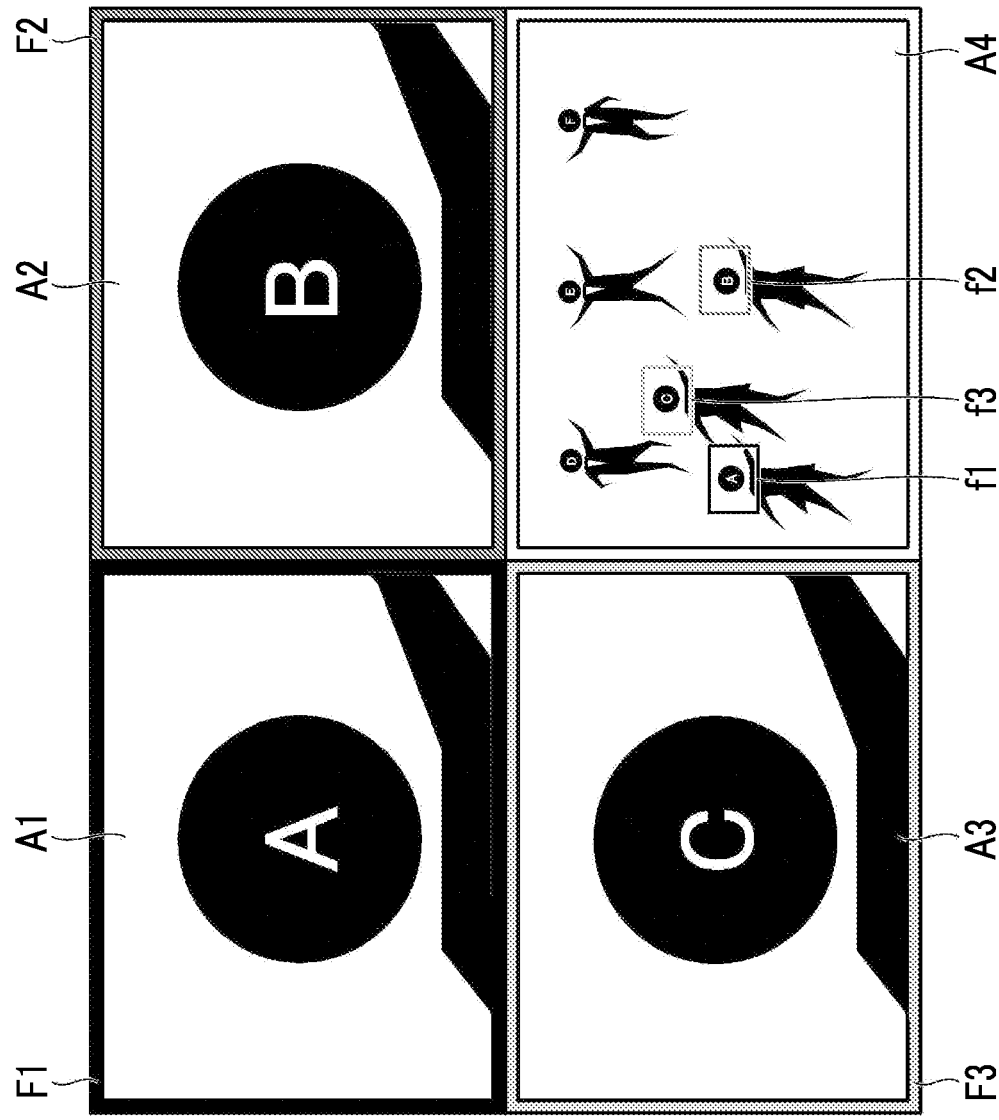
FIG. 23 is a diagram showing a modification example of display of the selection screen of the subject.

FIG. 23 is a diagram showing a modification example of the display of the selection screen of the subject.

In the example shown in FIG. 23, the subjects displayed in the display regions A1 to A3 are displayed by being surrounded with frames f1 to f3 such that the subjects can be distinguished in the entire image.

In the example shown in FIG. 23, the subject A, the subject B, and a subject C in the entire image are selected as the magnification candidates and are magnified and displayed in the display regions A1 to A3, respectively. In this case, as shown in FIG. 23, in the entire image displayed in the display region A4, the subject A, the subject B, and the subject C are displayed by being surrounded with the frames f1 to f3, respectively. The frames f1 to f3 are displayed in the same range as the ranges magnified and displayed in the display region A1 to A3.

In the example shown in FIG. 23, a configuration is adopted in which the outer peripheries of the display regions A1 to A3 are further surrounded with frames F1 to F3. The frames F1 to F3 are displayed in different colors, respectively. The frames f1 to f3 displayed in the entire image are also displayed in different colors, respectively. The frames f1 to f3 have the same color as the colors of the frames F1 to F3 of the corresponding display regions A1 to A3. For example, the color of the frame F1 that surrounds the first display region A1 is red, the color of the frame F2 that surrounds the second display region A2 is blue, and the color of the frame F3 that surrounds the third display region A3 is yellow. In this case, the color of the frame f1 that surrounds the subject to be displayed in the first display region A1 (subject A in a case of the example of FIG. 23) is red. In addition, the color of the frame f2 that surrounds the subject to be displayed in the second display region A2 (subject B in a case of the example of FIG. 23) is blue. In addition, the color of the frame f3 that surrounds the subject to be displayed in the third display region A3 (subject C in a case of the example of FIG. 23) is yellow. In the entire image, the subjects surrounded with the frames f1 to f3 (subjects A to C in a case of the example of FIG. 23) are examples of corresponding subjects.

In this way, by surrounding the subject (corresponding subject) corresponding to each display region with the frame having the same color as the frame of each display region in the entire image, a relationship between the subject displayed in each display region and the subject in the entire image can be grasped at a glance. As a result, the convenience can be further improved.

Figure 24:
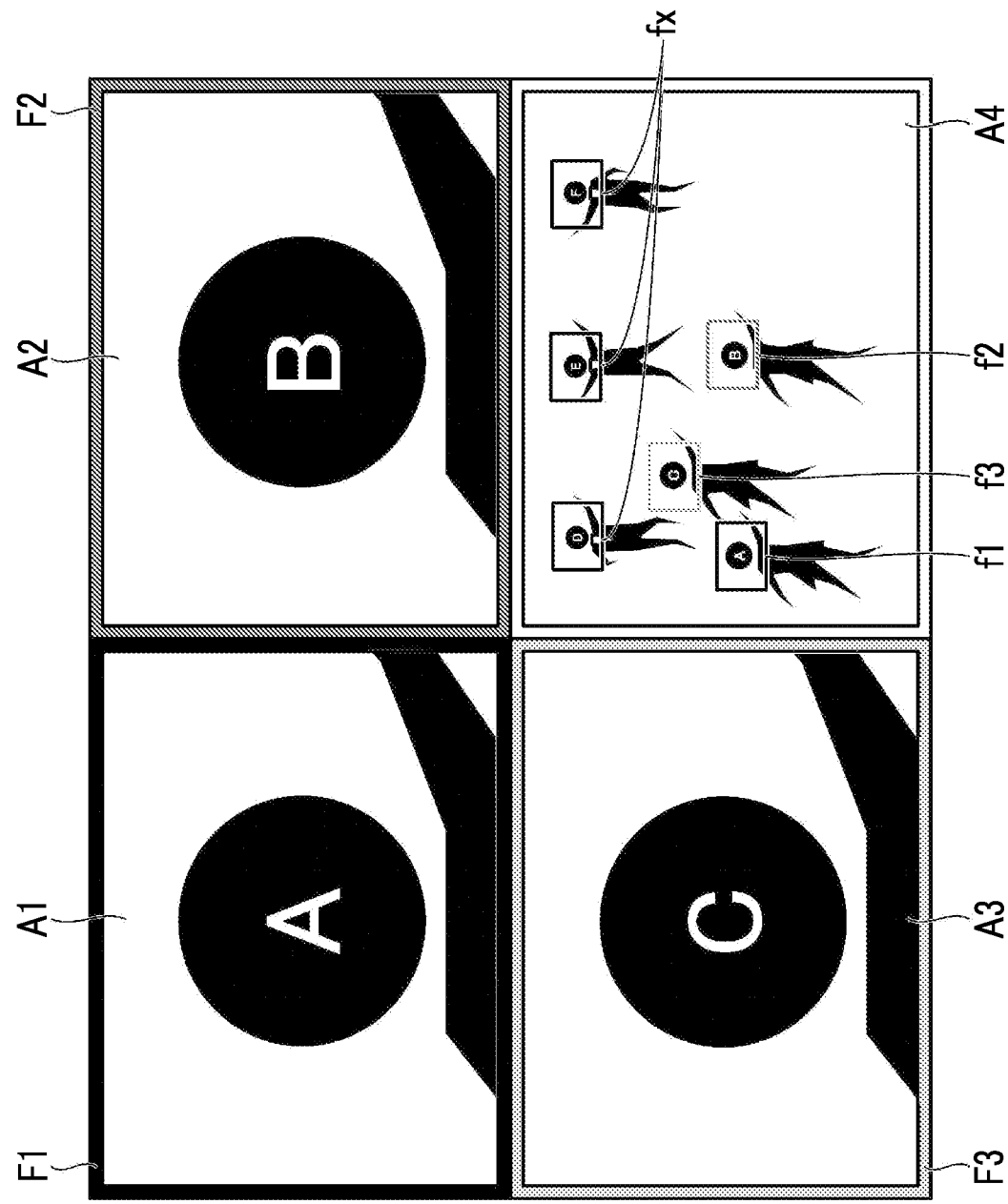
FIG. 24 is a diagram showing another modification example of the display of the selection screen of the subject.

FIG. 24 is a diagram showing another modification example of the display of the selection screen of the subject.

In the present example, a configuration is adopted in which, even the subject that is not displayed in the display regions A1 to A3 is displayed by being surrounded with a frame fx in the entire image. The frame fx has a different color from the colors of the frames f1 to f3 that surround the subjects displayed in the display regions A1 to A3. For example, the color is black.

In the example shown in FIG. 24, the subject A, the subject B, and the subject C are the subjects displayed in the display regions A1 to A3, and a subject D, a subject E, and a subject F are the subjects that are not displayed in the display regions A1 to A3. In this case, the subject A, the subject B, and the subject C are displayed by being surrounded with the frames f1 to f3 having the same color as the frames F1 to F3 that surround the corresponding display regions A1 to A3, respectively. On the other hand, the subject D, the subject E, and the subject F are displayed by being surrounded with the frame fx having a different color (for example, black) from the frames f1 to f3.

In the present example, a configuration is adopted in which the subject can be selected even in the entire image. In this case, for example, in the entire image, the positions surrounded with the frames f1 to f3, and fx are touched to select the subject to be displayed in the single magnification display.

As described above, the convenience and the operability can be further improved by adopting the configuration in which the subject can be selected even from the entire image.

It should be noted that, in the examples shown in FIGS. 23 and 24, a configuration is adopted in which the frames f1 to f3 that surround the subjects in the entire image are displayed in the same range as the magnification display ranges in the display regions A1 to A3. The display ranges (sizes) of the frames f to f3 do not necessarily have to be the same as the ranges magnified and displayed in the display regions A1 to A3. Any form may be used as long as the subject selected as the magnification candidate can be visually recognized.

Sixth Embodiment

In the imaging apparatus according to the present embodiment, a configuration is adopted in which the user can manually switch the display from the single magnification display to the selection screen of the subject. That is, in the embodiment described above, the configuration is adopted in which the display is automatically switched from the single magnification display to the selection screen of the subject, but the configuration is adopted in which the switching can also be manually performed in the imaging apparatus according to the present embodiment. As a result, the convenience and the operability can be further improved.

The CPU 24 switches the display from the single magnification display to the selection screen of the subject in response to a switching instruction from the operation unit 22. For example, a configuration is adopted in which the switching instruction is given by providing a dedicated button in the operation unit 22 and operating the button.

Similarly, a configuration may be adopted in which the user can also manually switch the display from the selection screen of the subject to the single magnification display. Also in this case, the CPU 24 switches the display from the selection screen of the subject to the single magnification display in response to the switching instruction from the operation unit 22. It should be noted that the single magnification display here is performed on, as a target, the subject that has been displayed in the single magnification display before the switching to the selection screen of the subject. That is, the original single magnification display is restored.

Seventh Embodiment

In the imaging apparatus according to the first embodiment, the configuration is adopted in which the predetermined priority degree is calculated based on the change amounts of the position, the size, and the phase difference of the subject for each subject extracted from the image, and the subject as the magnification candidate is selected in descending order of the calculated priority degree.

In the imaging apparatus according to the present embodiment, a configuration is adopted in which the user can set a condition for calculating the priority degree, that is, a condition for selecting the subject as the magnification candidate. Specifically, a configuration is adopted in which, in the expression for calculating the priority degree, the user can adjust the coefficients w1, w2, and w3 within a predetermined range. In the imaging apparatus according to the present embodiment, a configuration is adopted in which the adjustment is performed in a predetermined setting screen.

Figure 25:
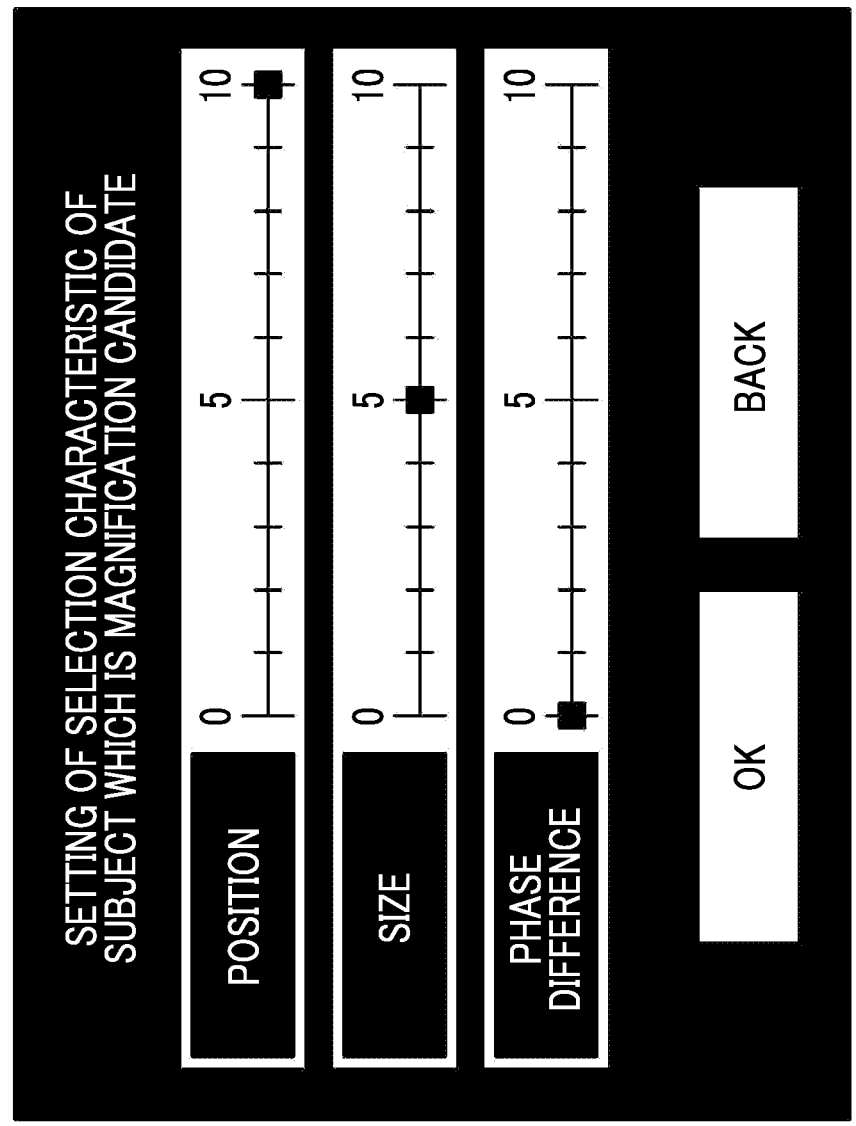
FIG. 25 is a diagram showing an example of a screen for adjusting a coefficient of an arithmetic expression for calculating the priority degree.

FIG. 25 is a diagram showing an example of the screen for adjusting the coefficient of the arithmetic expression for calculating the priority degree.

FIG. 25 shows an example of a case in which the coefficients of each item of the position, the size, and the phase difference of the subject are adjusted as the setting of the selection characteristic of the subject as the magnification candidate. The setting screen is called from, for example, the menu screen.

As shown in FIG. 25, on the setting screen of the present example, a lever for adjustment of the selection characteristic is individually displayed for each item of "position", "size", and "phase difference". The lever for adjustment is configured to be gradually adjusted in a range of "0" to "10".

In a case in which the lever is set to the "0" position for each item, a value of the coefficient is set to 0. By raising the position of the lever step by step, the coefficient is gradually raised at a predetermined rate of change. The lever is set to a maximum value at the "10" position.

In a case in which the lever is set to the "0" position, the item is excluded from a determination target in a case of the selection. That is, in this case, since the value of the coefficient is set to 0, the item is excluded from the determination target in a case of the selection.

In the example shown in FIG. 25, the lever is set to the "10" position for the item of "position", the lever is set to the "5" position for the item of "size", and the lever is set to the "0" position for the item of "phase difference". In this case, the magnification candidate is selected based on the position and the size of the subject, and the phase difference is excluded from the determination target. In addition, in a case of the selection, the selection is performed with an emphasis placed on the position rather than the size.

The set information (information on the coefficients w1 to w3) is stored in the storage unit 18. The magnification candidate selection unit 114 calculates the priority degree according to the set information and selects the subject as the magnification candidate.

In this way, the user can set the condition (condition for selecting the subject as the magnification candidate) in a case of calculating the priority degree, so that it is possible to select the subject intended by the user as the magnification candidate. As a result, the convenience and the operability can be further improved.

Eighth Embodiment

In the imaging apparatus according to the seventh embodiment, the configuration is adopted in which the user manually sets the condition for calculating the priority degree.

In the imaging apparatus according to the present embodiment, the condition for calculating the priority degree is automatically set based on the past subject selection tendency of the user. That is, the values of the coefficients w1 to w3 are automatically optimized.

In the imaging apparatus according to the present embodiment, the values of the coefficients w1 to w3 are set according to the switching rate. Specifically, the value of the coefficient of each item is set to be raised as the switching rate for each item is raised. A high switching rate means that the subject is often selected due to the change in the item. Therefore, in this case, the coefficient is set to a large value. On the other hand, a low switching rate means that the subject is rarely selected due to the change in the item. Therefore, in this case, the coefficient is set to a small value.

In this way, it is possible to automatically select the subject intended by the user as the magnification candidate by automatically correcting the condition for calculating the priority degree. As a result, the convenience and the operability can be further improved.

Ninth Embodiment

In the imaging apparatus according to the embodiment described above, in a case in which the display is switched from the single magnification display to the selection screen of the subject, in a case in which the selection of the subject is not performed within the defined time, the original single magnification display is restored.

It is considered that the fact that the selection of the subject is not performed means that the display is not switched as intended by the user.

In the imaging apparatus according to the present embodiment, in a case in which the original single magnification display is restored without the selection of the subject, the switching of the display under the same condition is prohibited for a predetermined time thereafter. For example, in a case in which the single magnification display is switched to the selection screen of the subject based on the change in the position, in a case in which the selection of the subject is not performed within the defined time, the single magnification display is restored, and then the switching of the display based on the change in the position is prohibited for the predetermined time. Hereinafter, a configuration for performing the present processing will be described.

Figure 26:
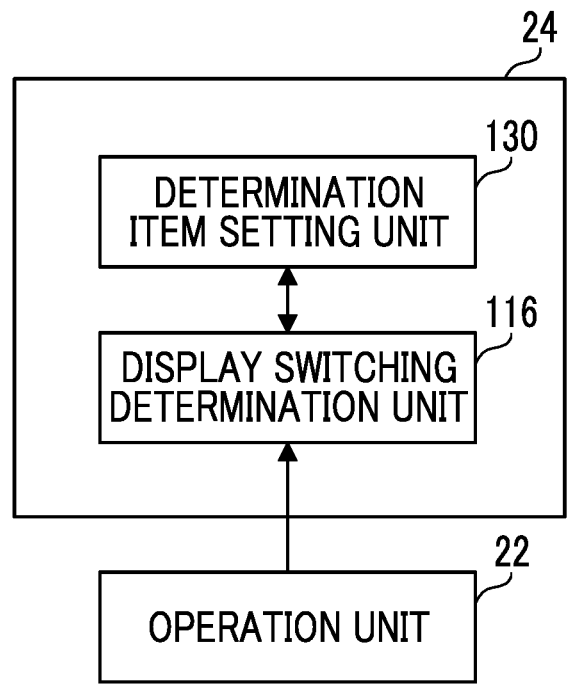
FIG. 26 is a block diagram showing an example of a function realized by the CPU in a case in which switching of the display based on a change of a specific item is prohibited.

FIG. 26 is a block diagram showing an example of a function realized by the CPU in a case in which the switching of the display based on a change of a specific item is prohibited.

As shown in FIG. 26, in order to prohibit the switching of the display based on the change in the specific item in a case in which the selection of the subject is not performed, the CPU 24 further functions as a determination item setting unit 130.

The determination item setting unit 130 individually sets turning on or off of the item used by the display switching determination unit 116 to determine the presence or absence of the change in the subject, based on the determination result of the display switching determination unit 116. For example, for each item, a determination usage flag is set to "1" in a case in which the item is used for the determination, and the determination usage flag is set to "0" in a case in which the item is not used for the determination. The determination usage flag is normally set to "1" and is set to "0" in a specific case. The specific case is a case in which the selection of the subject is not performed. In this case, the determination usage flag is set to "0" for the item that is the trigger for the switching of the display, that is, the item for which the change being equal to or more than the threshold value is measured. For example, in a case in which the single magnification display is switched to the selection screen of the subject based on the change in the position, in a case in which the selection of the subject is not performed within the defined time, the single magnification display is restored, and then the determination usage flag for the position is set to "0". For the item in which the determination usage flag is set to "0", the determination usage flag is returned to 1 after a predetermined stop time has elapsed. The stop time is an example of a second time.

The display switching determination unit 116 determines the presence or absence of the change in the subject based on the determination usage flag set by the determination item setting unit 130, and determines whether or not the switching of the display of the live view is necessary. Specifically, the presence or absence of the change in the subject is determined based on the change in the item in which the determination usage flag is set to "1", and whether or not the display of the live view needs to be switched is determined. For example, at a certain determination timing, the determination usage flag for the position is set to "0", the determination usage flag for the size is set to "1", and the determination usage flag for the phase difference is set to "1". In this case, the determination of the presence or absence of the change in the subject based on the change of the position is excluded, and the presence or absence of the change in the subject is determined only based on the presence or absence of the changes in the size and the phase difference.

As described above, in a case in which the selection of the subject is not performed in the selection screen of the subject, for the item which is the trigger for the switching of the display, the determination usage flag is set to "0" for the predetermined stop time after the single magnification display is restored. While the determination usage flag is "0", the item is excluded from the determination of the presence or absence of the change in the subject. That is, the switching of the display based on the change is prohibited.

In this way, in a case in which the selection of the subject is not performed, the switching of the display under the same condition is prohibited for the predetermined time, so that it is possible to prevent the switching of the display that is not intended by the user. As a result, the operability can be further improved.

Modification Example

In the embodiment described above, the configuration is adopted in which, in a case in which the selection of the subject is not performed, for the item that is the trigger for the switching of the display, the item is excluded from the target of determination of the presence or absence of the change in the subject for the predetermined stop time. In addition to or instead of the above configuration, a configuration can also be adopted in which the subject that is the trigger for the switching of the display, that is, the subject determined that the change has occurred is excluded from the target of the determination of the presence or absence of the change for the predetermined stop time. In this case, since it is considered that the user does not use the subject as the target to be magnified it is possible to switch the display more intended by the user by prohibiting the switching of the display due to the subject.

In a case of the present example, the CPU 24 sets, for example, the determination usage flag for each subject. In a case in which the selection of the subject is not performed, for the subject which is the trigger for the switching of the display, that is, for the subject determined that the change has occurred, the determination usage flag is set to "0" for the predetermined stop time after the single magnification display is restored.

OTHER EMBODIMENTS

[Magnification Ratio of Image during Single Magnification Display]

The magnification ratio of the image in a case of the single magnification display may be a fixed value or may be configured to be optionally changed by the user. In addition, a configuration may be adopted in which the magnification ratio is automatically changed according to an imaging condition or the like.

As an example of the configuration in which the magnification ratio is automatically changed, for example, a configuration can be adopted in which the magnification ratio is changed according to a depth of field during the imaging. In this case, a configuration can also be adopted in which the magnification ratio is raised in a case in which the depth of field is shallow. A case in which the depth of field is shallow is a case in which fine focus adjustment is necessary. Therefore, in this case, a configuration is adopted in which the magnification ratio is raised to enable the user to confirm an in-focus state in more detail. On the other hand, in a case in which the depth of field is deep, it is considered that fine focus adjustment is not necessary. Therefore, a configuration is adopted in which the magnification ratio is lowered and the image can be confirmed from a bird's-eye view.

For example, the CPU 24 acquires information necessary for calculating the depth of field, and performs processing of raising the magnification ratio in a case in which the depth of field is set to be narrower than a specific value. In the processing of raising the magnification ratio, for example, processing of raising the magnification ratio at a predetermined magnification with respect to the magnification ratio determined as a standard is performed. A configuration can also be adopted in which the magnification ratio is gradually changed according to the depth of field.

As another example of the configuration in which the magnification ratio is automatically changed, for example, a configuration can be adopted in which the magnification ratio is changed according to a value of a high-frequency component in a region to be magnified. In this case, a configuration can also be adopted in which the magnification ratio is lowered in a case in which the value of the high-frequency component in the region to be magnified is low. A case in which the value of the high-frequency component in the region to be magnified is low is a case in which an edge component in the region is small. In a case in which the edge component is small, it is difficult to determine whether or not the image is in focus. Therefore, a configuration is adopted in which the magnification ratio is lowered and the image can be confirmed from a bird's-eye view in a case in which the value of the high-frequency component in the region to be magnified is low, that is, in a case in which the edge component is small. That is, more information is captured and the focus adjustment is facilitated.

For example, the CPU 24 calculates the high-frequency component in the region to be magnified, and performs processing of lowering the magnification ratio in a case in which the high-frequency component is less than a specific value. In the processing of lowering the magnification ratio, for example, processing of lowering the magnification ratio at a predetermined magnification with respect to the magnification ratio determined as a standard is performed. A configuration can also be adopted in which the magnification ratio is gradually changed according to the value of the high-frequency component.

Similarly, for the image to be displayed in each display region in the selection screen of the subject, a configuration can be adopted in which the magnification ratio is changed according to the depth of field, the value of the high-frequency component, and the like.

In addition, a configuration may be adopted in which the magnification ratio of each display region can be individually and manually adjusted. For example, a configuration may be adopted in which, in a case in which the display unit 16 comprises the touch panel, the magnification ratio is changed by a pinch-in operation or a pinch-out operation in each display region.

[Display Destination of Live View]

In the embodiment described above, the configuration is adopted in which the live view is displayed on the display unit 16 provided in the apparatus body, but a configuration can also be adopted in which the live view is displayed on the external display device connected to the apparatus body via the connection unit 29. In addition, a configuration can also be adopted in which the live view is displayed on both the display unit 16 and the external display device.

[Target to be Magnified]

In the embodiment described above, as an example, the case has been described in which the face of the person is extracted as the subject and the region of the face is magnified and displayed, but the subject which is the target to be magnified is not limited to this. It is also possible to set an entire person as the subject which is the target to be magnified. In addition to the person, a moving object can be widely used as the subject.

A configuration may be adopted in which a type of the subject which is the target can be set by the user. For example, a configuration may be adopted in which the subject which is the target can be limited to the face of the person or can be limited to the entire person.

[Selection of Target to be Magnified in Case in which Tracking Magnification Display Function is Turned On]

In the embodiment described above, the configuration is adopted in which the user manually sets the subject (example of a specific subject) to be magnified in a case in which the tracking magnification display function is turned on. A configuration can also be adopted in which the processing is automatically performed. In this case, the CPU 24 automatically selects the subject which is the target to be magnified from among the plurality of subjects extracted from the image according to a predetermined selection criterion. As an example of the selection criterion, a method of selecting a subject closest to the center of the screen as the target to be magnified can be adopted. In addition, as another example thereof, a method of selecting a subject having the shortest subject distance as the target to be magnified can be adopted. In addition, as still another example thereof, a method of selecting a subject having the smallest defocus amount as the target to be magnified can be adopted. In addition, as still another example thereof, a method of selecting a subject in the in-focus state as the target to be magnified can be adopted. In a case in which the subject in the in-focus state is selected as the target to be magnified, in a case in which there are a plurality of subjects in the in-focus state, a method of combining other conditions (for example, the subject closest to the center of the screen and the subject having the shortest subject distance) and selecting the subject which is the target to be magnified can be adopted. Further, a configuration may be configured in which a plurality of selection criteria are set and the user can optionally select the selection criterion to be used.

In addition, in the embodiment described above, as a method of manually selecting the subject which is the target to be magnified by the user, a configuration is adopted in which the face of each subject extracted from the entire image is surrounded with the bounding box, the displayed bounding box is selected, and the subject which is the target to be magnified is selected. The method of selecting the subject which is the target to be magnified is not limited to this. For example, it is possible to adopt a form in which the subject as the magnification candidate is extracted, displayed in a list, and selected by the user.

[Selection of Subject as Magnification Candidate]

As the subjects to be magnification candidates, the same number of subjects as the number of subjects to be displayed in the selection screen of the subject (the number of display regions) are selected. The number of subjects to be displayed in the selection screen of the subject is equal to or more than 2.

In a case in which the number of subjects extracted from the image is less than the number of subjects displayed in the selection screen of the subject, the processing of selecting the subject as the magnification candidate is not performed. In this case, in the selection screen of the subject, a part of the display region is displayed in blank (for example, a black screen). Alternatively, the display of the initial selection screen of the subject, which will be described below, may be used.

In addition, the subject as the magnification candidate does not necessarily have to target all the subjects in the image. For example, the subject can be excluded, from at least one viewpoint of the position, the size, or the subject distance (phase difference) of the subject in the image. For example, regarding the position of the subject in the image, a subject at a position separated from the center of the screen by a distance equal to or more than a predetermined distance can be excluded. In addition, regarding the size of the subject in the image, it is possible to exclude a subject having a size equal to or less than a predetermined size. Further, regarding the subject distance, it is possible to exclude a subject at a position separated by a distance equal to or more than a predetermined distance.

In addition, it is also possible to set only the subject registered in advance as the target. For example, in a case of the person, a configuration can also be adopted in which personal authentication is performed from the image and the subject is selected as the magnification candidate from among the subjects registered in advance.

In addition, in the embodiment described above, the configuration is adopted in which the subject as the magnification candidate is selected based on the priority degree calculated based on the predetermined arithmetic expression, but the method of selecting the subject as the magnification candidate is not limited to this. For example, a configuration can be adopted in which the selection is performed based on at least one of the position, the size, or the subject distance in the image. For example, in a case of the selection based on the position, a configuration can be adopted in which the subjects close to the center of the screen are sequentially selected. In addition, for example, in a case of the selection based on the size, a configuration can be adopted in which the subjects having a large area occupied in the image are sequentially selected. In addition, for example, in a case of the selection based on the subject distance, a configuration can be adopted in which the subjects close to the imaging apparatus are sequentially selected. In addition, a combination of these conditions can be used for the selection.

[Display of Selection Screen of Subject]

In the embodiment described above, the configuration is adopted in which, as the selection screen of the subject, one screen is divided into four equal parts, and the subject as the magnification candidate is magnified and displayed in each display region, but the number of displays and the display form of the subject which is the magnification candidate are not limited to this. For example, a configuration can also be adopted in which the number of displays and the display form are switched according to the number of subjects extracted as the magnification candidates. In addition, a configuration can also be adopted in which the user can optionally select the number of displays.

In addition, a configuration can also be adopted in which the number of displays is automatically switched according to a display destination. For example, in a case of displaying on the external display device, the number of displays can be increased as compared with a case of displaying on the display unit provided in the apparatus body. For example, the number of displays of the display unit provided in the apparatus body can be 4 (2×2), whereas the number of displays of the external display device can be 9 (3×3).

Figure 27:
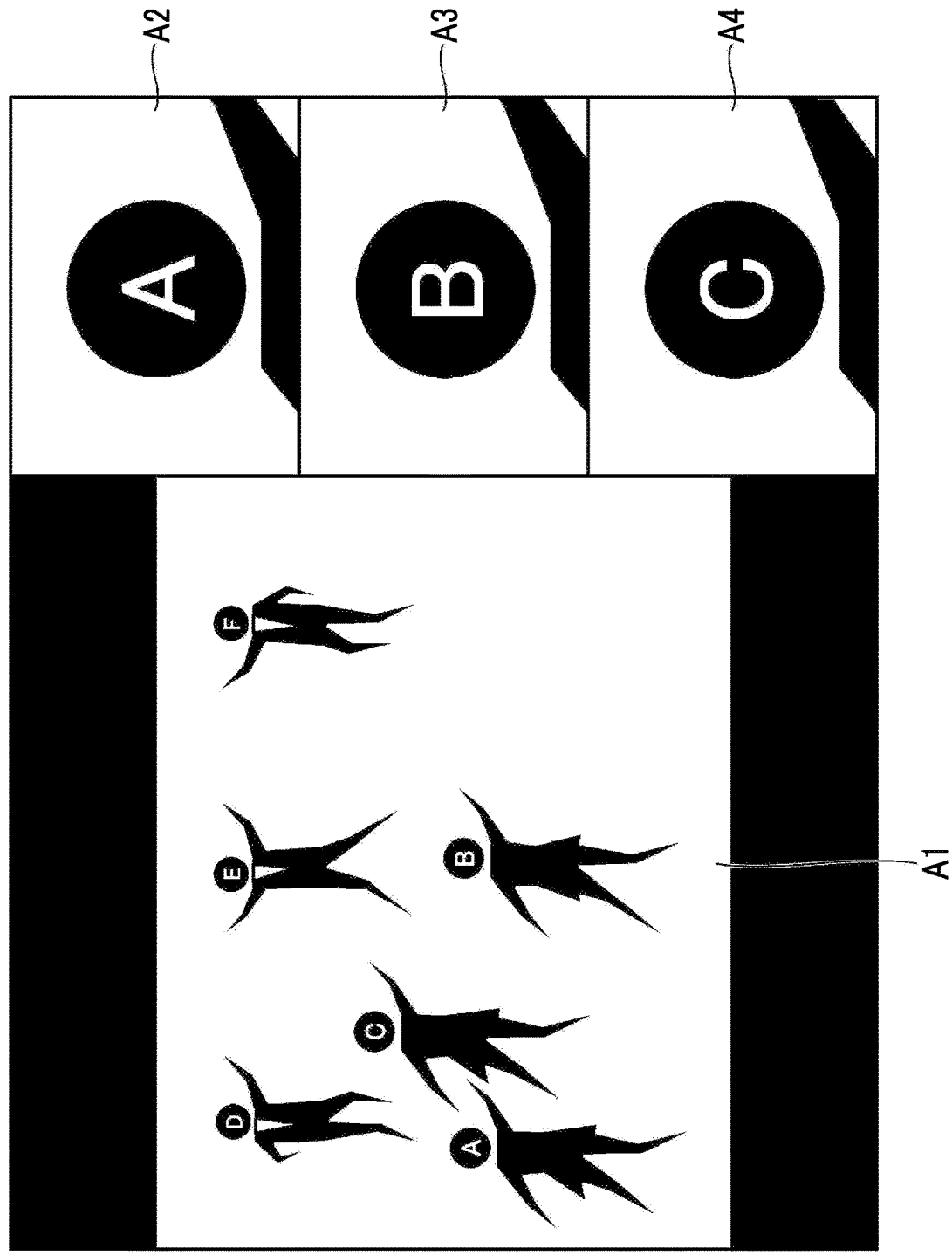
FIG. 27 is a diagram showing another example of screen division in the selection screen of the subject.
Figure 28:
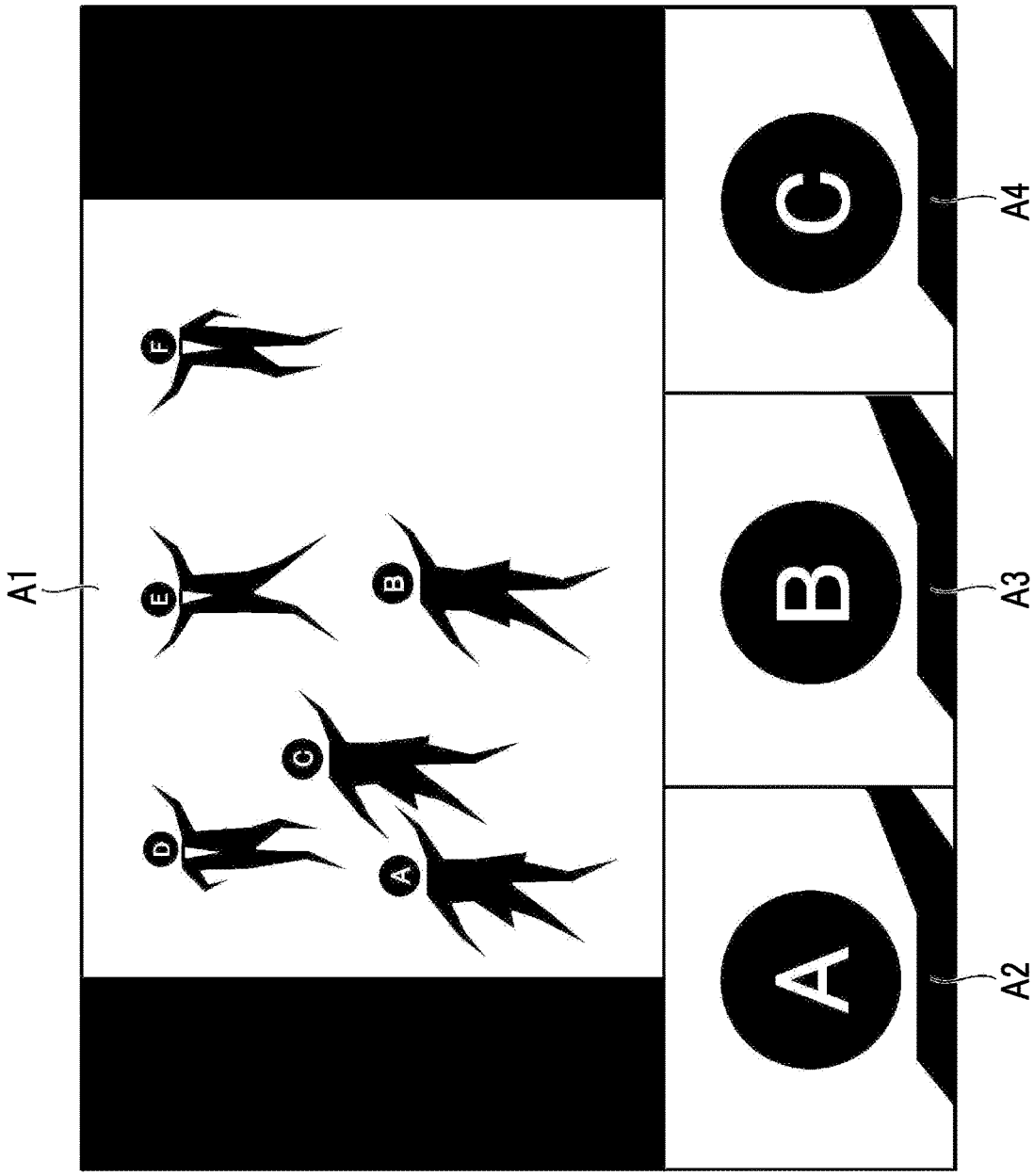
FIG. 28 is a diagram showing still another example of screen division in the selection screen of the subject.
Figure 29:
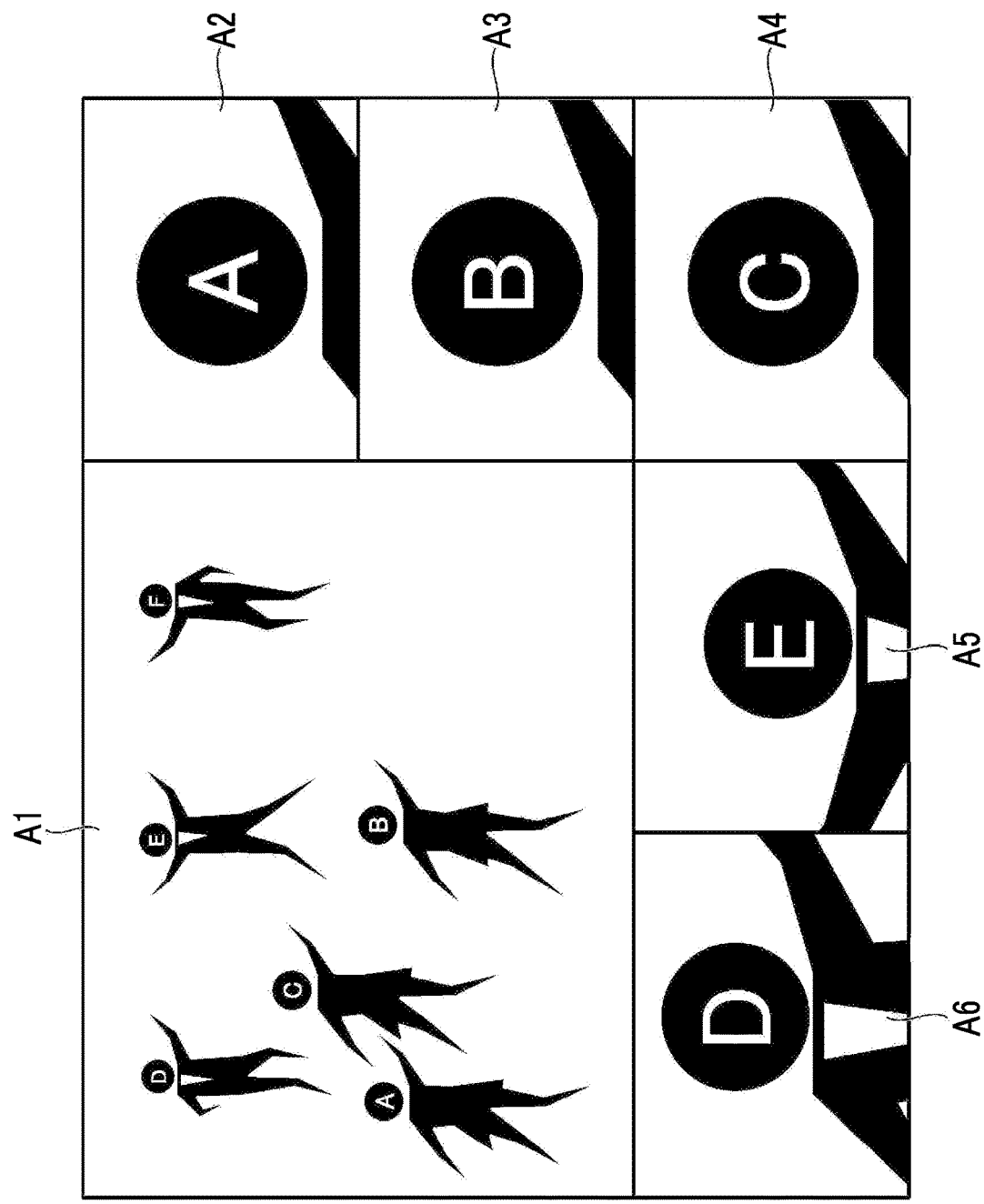
FIG. 29 is a diagram showing still another example of screen division in the selection screen of the subject.

In addition, in the embodiment described above, the configuration is adopted in which one screen is divided into equal parts to provide a plurality of display regions of the subject, but the form of the screen division is not limited to this. FIGS. 27 to 29 are diagrams showing another example of the screen division in the selection screen of the subject. The examples shown in FIGS. 27 to 29 are examples of the case in which the entire image is displayed larger than the subject as the magnification candidate. FIG. 27 is an example in which four display regions A1 to A4 are set in one screen. The entire image is displayed in the large display region A1 set at the position on the left side of the center of the screen, and the subjects as the magnification candidates are displayed in small display regions A2 to A4 set by arranging the subjects vertically along the right side of the screen. FIG. 28 is an example in which four display regions A1 to A4 are set in one screen. The entire image is displayed in the large display region A1 set at the position on the upper side of the center of the screen, and the subjects as the magnification candidates are displayed in small display regions A2 to A4 set by arranging the subjects horizontally along the lower side of the screen. FIG. 29 is an example in which six display regions A1 to A6 are set in one screen. The entire image is displayed in the large display region A1 set at the position on the upper left corner of the screen, and the subjects as the magnification candidates are displayed in small display regions A2 to A6 set by arranging the subjects along the right side and the lower side of the screen.

Figure 30:
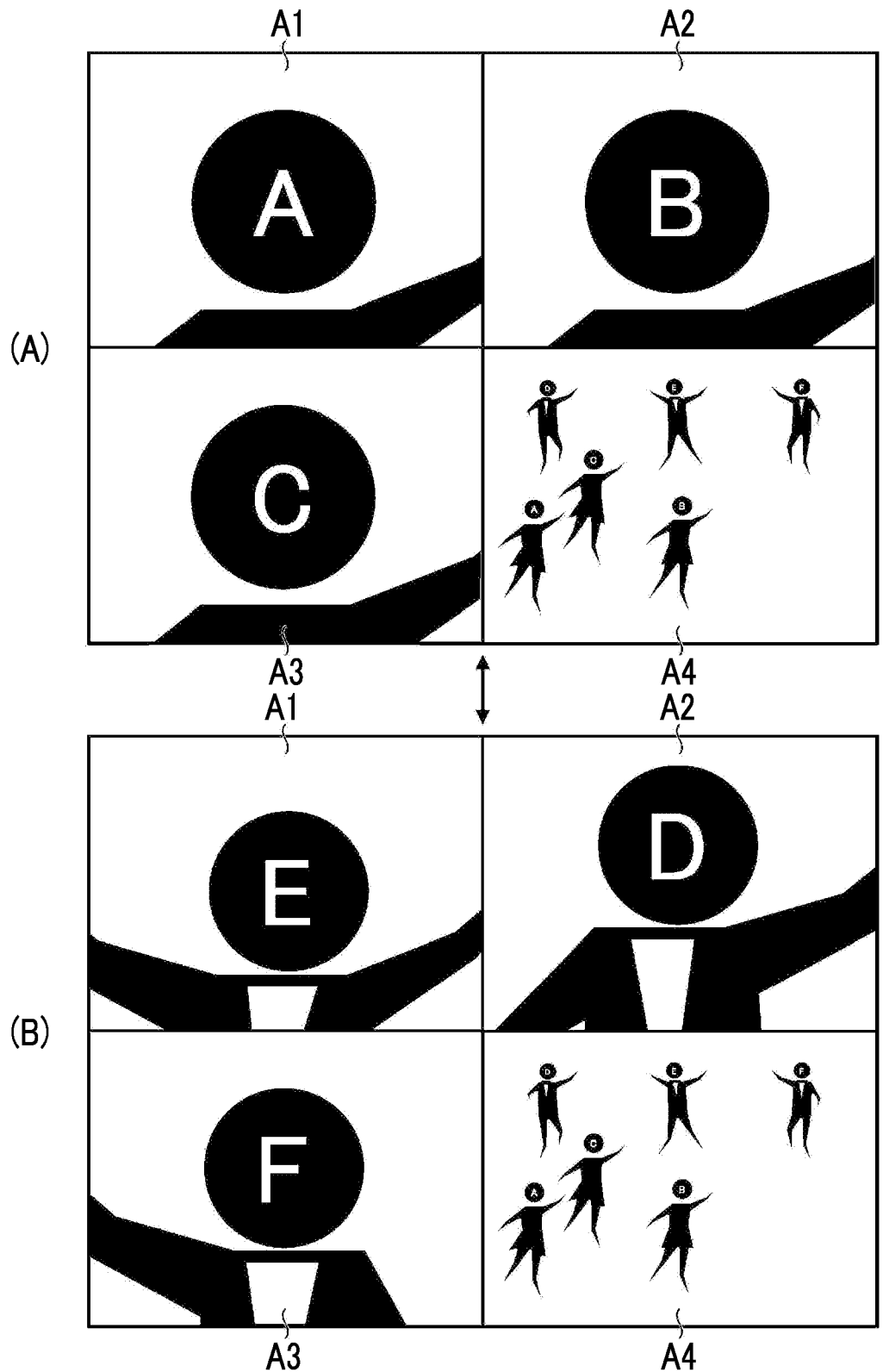
FIG. 30 is a diagram showing an example of transition of the screen in a case in which the subjects as magnification candidates are switched and displayed.

In addition, a configuration may be adopted in which, in the selection screen of the subject, the subjects as the magnification candidates are sequentially switched and displayed. FIG. 30 is a diagram showing an example of transition of the screen in a case in which the subjects as the magnification candidates are switched and displayed. A portion (A) in FIG. 30 shows an example of the display of the initial selection screen of the subject after the switching to the selection screen of the subject. A portion (B) in FIG. 30 shows an example of the display of the selection screen of the subject after an elapse of a predetermined time. As shown in the portions (A) and (B) in FIG. 30, the subjects as the magnification candidates displayed in the display regions A1 to A3 are switched. The switching is periodically performed. The user may be able to optionally set this switching period.

In this way, the number of subjects that can be displayed as the magnification candidates can be increased by switching the subjects as the magnification candidates to be displayed in the display regions A1 to A3.

It should be noted that, in the present example, the configuration is adopted in which the switching of the subject is periodically performed, but a configuration can also be adopted in which the subject to be displayed is switched according to the instruction from the user. For example, in a case in which the display unit comprises the touch panel, a configuration can be adopted in which the display is switched by a swipe operation, a flick operation, or the like of the screen.

In addition, in the present example, the configuration is adopted in which the screen is divided into a plurality of regions, and the image (magnification image) of the subject to be displayed is sequentially switched for each region, but a configuration may be adopted in which the switching is sequentially performed in one screen.

[Subject Distance]

In the imaging apparatus according to the embodiment described above, the configuration is adopted in which the phase difference of each subject is obtained to acquire the information on the subject distance, but the method of acquiring the information on the subject distance is not limited to this. A configuration can also be adopted in which, for the information on the subject distance, a measurement result of another known distance measurement unit is used.

[Another Example of Operation Unit]

In the embodiment described above, the configuration is adopted in which the operation, such as the selection of the subject which is the target to be magnified, is performed by the touch panel provided on the display unit 16, but a configuration can also be adopted in which the selection is performed by a key operation, a lever operation, a dial operation, and the like. For example, in the selection screen of the subject, in a case of selecting the subject which is the target to be magnified by the key operation, the lever operation, or the dial operation, a configuration can be adopted in which a selection frame is displayed in the screen and the frame is moved by the key operation, the lever operation, or the dial operation to select the subject which is the target to be magnified.

[Turning on or Off of Tracking Magnification Display Function]

In the embodiment described above, the configuration is adopted in which the tracking magnification display function can be used only in a case in which the manual focus mode is set, but a configuration may be adopted in which the tracking magnification display function can be used in other focus modes. For example, in a case of the auto focus mode, it can be used for selecting the subject to be the focus adjustment target. In addition, the same effect is exhibited in the semi-auto focus mode.

[Example of Imaging Apparatus]

The imaging apparatus to which the present invention is applied includes an imaging apparatus incorporated in a smartphone, a personal computer, or the like, in addition to an imaging apparatus dedicated to moving image capturing, such as a so-called video camera and a cine camera.

[Hardware Configuration of Processing Unit]

In the present invention, a hardware structure of the processing unit that performs each processing is realized by various processors. The various processors include a central processing unit (CPU) and/or a graphic processing unit (GPU), which is a general-purpose processor that executes the program to function as the various processing units, a programmable logic device (PLD), which is a processor of which a circuit configuration can be changed after the manufacture, such as a field programmable gate array (FPGA), a dedicated electric circuit, which is a processor having a circuit configuration specially designed for executing specific processing, such as an application specific integrated circuit (ASIC), and the like. The program is synonymous with the software.

One processing unit may be configured by one of these various processors or may be configured by two or more processors of the same type or different types. For example, one processing unit may be configured by a plurality of FPGAs or a combination of the CPU and the FPGA. Further, a plurality of processing units may be configured by one processor. A first example in which the plurality of processing units are configured by one processor is a form in which one processor is configured by a combination of one or more CPUs and software, and this processor functions as the plurality of processing units as represented by a computer used in a client or a server. A second example thereof is a form in which a processor, which realizes the functions of the entire system including the plurality of processing units with a single integrated circuit (IC) chip, is used as represented by a system on chip (SoC) or the like. In this way, various processing units are configured by one or more of the various processors described above as the hardware structure.

EXPLANATION OF REFERENCES

10: imaging apparatus
12: imaging optical system
14: imaging unit
16: display unit
18: storage unit
20: connection unit
22: operation unit 24: CPU
26: ROM
28: RAM
29: connection unit
110: subject extraction unit
112: change amount measurement unit
112A: position change amount measurement unit
112B: size change amount measurement unit
112C: phase difference change amount measurement unit
114: magnification candidate selection unit
116: display switching determination unit
118: display moving image data generation unit
120: selection result recording unit
122: determination condition correction unit
130: determination item setting unit
A to F: subject
A1 to A6: display region
BB: bounding box
F1 to F3: frame
f1 to f3: frame
fx: frame
S11 to S20: procedure for determining presence or absence of change in subject
S31 to S46: procedure for switching of display of live view
S51 to S57: procedure for correcting condition for determining whether or not change has occurred in subject

What is claimed is:

1. An imaging apparatus comprising:
a processor,
wherein, in a mode in which focus adjustment is performed, the processor
performs processing of extracting a plurality of subjects from moving image data obtained by imaging,
outputs first moving image data in which a region including a specific subject among the plurality of subjects is magnified to a display destination, and
outputs, in a case in which a change has occurred in any of the plurality of subjects in the moving image data, second moving image data in which a region of each of the plurality of subjects is magnified to the display destination instead of the first moving image data, and then outputs, in a case in which an instruction to select the subject is given, third moving image data in which a region including the selected subject is magnified to the display destination instead of the second moving image data.

2. The imaging apparatus according to claim 1,
wherein, in a case in which the instruction to select the subject is not given within a first time after the second moving image data is output to the display destination instead of the first moving image data, the processor outputs the first moving image data to the display destination instead of the second moving image data.

3. The imaging apparatus according to claim 1,
wherein the plurality of subjects magnified in the second moving image data include at least the subject in which the change has occurred.

4. The imaging apparatus according to claim 1,
wherein the processor further performs processing of receiving a setting of a condition for determining whether or not the change has occurred in the subject.

5. The imaging apparatus according to claim 1,
wherein the processor further performs processing of correcting a condition for determining whether or not the change has occurred in the subject based on a history of the instruction to select the subject.

6. The imaging apparatus according to claim 4,
wherein the condition includes at least one of an item used for determination or a threshold value used for determination.

7. The imaging apparatus according to claim 1,
wherein the processor determines whether or not the change has occurred in the subject based on a change in at least one item of a position, a size, or a subject distance.

8. The imaging apparatus according to claim 1,
wherein the processor outputs, as the second moving image data, an image in which magnification images of the plurality of subjects are sequentially switched to the display destination.

9. The imaging apparatus according to claim 1,
wherein the processor outputs, as the second moving image data, an image including an entire image of the moving image data to the display destination in addition to magnification images of the plurality of subjects.

10. The imaging apparatus according to claim 9,
wherein the processor performs processing of surrounding the magnification images with frames having different colors, respectively, and surrounding corresponding subjects in the entire image with frames having the same color, respectively, in the second moving image data.

11. The imaging apparatus according to claim 1,
wherein the processor further performs processing of selecting a target to be magnified in the second moving image data from among the plurality of subjects extracted from the moving image data.

12. The imaging apparatus according to claim 11,
wherein the processor further performs processing of receiving a setting of a condition for selecting the target to be magnified in the second moving image data.

13. The imaging apparatus according to claim 11,
wherein the processor further performs processing of correcting the condition for selecting the target to be magnified in the second moving image data based on a history of the instruction to select the subject.

14. The imaging apparatus according to claim 11,
wherein the processor selects the target to be magnified in the second moving image data based on a change in at least one item of a position, a size, or a subject distance.

15. The imaging apparatus according to claim 1,
wherein, in a case in which the instruction to select the subject is not given within a first time after the second moving image data is output to the display destination, the processor excludes the subject, which is determined that the change has occurred in a case in which the first moving image data is switched to the second moving image data, from a target for which the change is detected during a second time after elapse of the first time.

16. The imaging apparatus according to claim 1,
wherein, in a case in which a determination as to whether or not the change has occurred in the subject is made for a plurality of items, in a case in which the instruction to select the subject is not given within a first time after the second moving image data is output to the display destination, the processor excludes an item, which is determined that the change has occurred in a case in which the first moving image data is switched to the second moving image data, from a condition for detecting the change during a second time after elapse of the first time.

17. The imaging apparatus according to claim 1,
wherein, in a case in which a setting of making a depth of field in the imaging narrower than a specific value is performed, the processor raises a magnification ratio of the subject in a case of magnification display.

18. The imaging apparatus according to claim 1,
wherein, in a case in which a value of a high-frequency component in a region to be magnified is less than a specific value, the processor lowers a magnification ratio of the subject in a case of magnification display.

19. The imaging apparatus according to claim 1,
wherein a display unit provided in an apparatus body and/or an external display device connected via a connection unit provided in the apparatus body is used as the display destination.

20. An image processing method comprising:
extracting a plurality of subjects from moving image data obtained by imaging;
outputting first moving image data in which a region including a specific subject among the plurality of subjects is magnified to a display destination; and
outputting, in a case in which a change has occurred in any of the plurality of subjects in the moving image data, second moving image data in which a region of each of the plurality of subjects is magnified to the display destination instead of the first moving image data, and then outputting, in a case in which an instruction to select the subject is given, third moving image data in which a region including the selected subject is magnified to the display destination instead of the second moving image data.

21. A non-transitory, computer-readable tangible recording medium, which records thereon a program for causing, when read by a computer, the computer to execute a process comprising:
extracting a plurality of subjects from moving image data obtained by imaging;
outputting first moving image data in which a region including a specific subject among the plurality of subjects is magnified to a display destination; and
outputting, in a case in which a change has occurred in any of the plurality of subjects in the moving image data, second moving image data in which a region of each of the plurality of subjects is magnified to the display destination instead of the first moving image data, and then outputting, in a case in which an instruction to select the subject is given, third moving image data in which a region including the selected subject is magnified to the display destination instead of the second moving image data.

* * * * *